US008794976B2

(12) United States Patent
Kan et al.

(10) Patent No.: US 8,794,976 B2
(45) Date of Patent: Aug. 5, 2014

(54) SYSTEMS AND METHODS FOR EVALUATING NEUROBEHAVIOURAL PERFORMANCE FROM REACTION TIME TESTS

(75) Inventors: Kevin Gar Wah Kan, Richmond (CA); Christopher Grey Mott, Vancouver (CA); Daniel Joseph Mollicone, Philadelphia, PA (US)

(73) Assignee: Trustees of the Univ. of Pennsylvania, Philadelphia, PA (US)

( * ) Notice: Subject to any disclaimer, the term of this patent is extended or adjusted under 35 U.S.C. 154(b) by 757 days.

(21) Appl. No.: 12/776,142

(22) Filed: May 7, 2010

(65) Prior Publication Data

US 2010/0311023 A1    Dec. 9, 2010

Related U.S. Application Data

(60) Provisional application No. 61/215,571, filed on May 7, 2009.

(51) Int. Cl.
*G09B 19/00* (2006.01)
(52) U.S. Cl.
USPC .......................................... 434/258; 434/236
(58) Field of Classification Search
USPC .................................................. 434/236, 262
See application file for complete search history.

(56) References Cited

U.S. PATENT DOCUMENTS

| | | | |
|---|---|---|---|
| 4,038,561 A | 7/1977 | Lorenz | |
| 4,228,806 A | 10/1980 | Lidow | |
| 4,234,944 A | 11/1980 | Komaki et al. | |
| 4,464,121 A | * 8/1984 | Perelli | 434/236 |
| 4,502,489 A | * 3/1985 | Alston, Jr. | 600/559 |
| 4,670,864 A | 6/1987 | Hoffmann | |
| 4,724,378 A | 2/1988 | Murray et al. | |
| 4,894,813 A | 1/1990 | Pacher et al. | |
| 5,006,985 A | 4/1991 | Ehret et al. | |

(Continued)

FOREIGN PATENT DOCUMENTS

| | | |
|---|---|---|
| CA | 2439938 | 9/2002 |
| CA | 2599984 | 9/2006 |
| FR | 2893245 | 5/2007 |
| JP | 2007044203 | 2/2004 |

OTHER PUBLICATIONS

Hymen, "Stimulus information as determinant of reaction time", Nov. 1952, John Hopkins University Report No. 166-I_163 Project Designation No. NR 507-470.*

(Continued)

*Primary Examiner* — Robert J Utama
*Assistant Examiner* — Sadaruz Zaman
(74) *Attorney, Agent, or Firm* — Todd A. Rattray, Esq.; Damian M. Biondo, Esq.

(57) ABSTRACT

Method are provided for evaluating reaction time data obtained from a stimulus-response testing system. One exemplary method comprises: obtaining reaction time data, the reaction time data comprising a plurality of reaction times, each reaction time comprising an estimate of a time required for a subject to respond to a corresponding stimulus event; assigning a weight to each reaction time in the reaction time data in accordance with a weighting function, the weighting function comprising a rule that defines a mapping between reaction times and corresponding weights; and determining a weighted reaction time metric based at least in part on a sum of the weights assigned to the reaction times in the reaction time data.

37 Claims, 11 Drawing Sheets

(56) References Cited

U.S. PATENT DOCUMENTS

| | | | |
|---|---|---|---|
| 5,101,831 A | | 4/1992 | Koyama et al. |
| 5,103,408 A | * | 4/1992 | Greenberg et al. ............. 700/90 |
| 5,140,562 A | | 8/1992 | Moore-Ede et al. |
| 5,163,426 A | | 11/1992 | Czeisler et al. |
| 5,167,228 A | | 12/1992 | Czeisler et al. |
| 5,176,133 A | | 1/1993 | Czeisler et al. |
| 5,197,941 A | | 3/1993 | Whitaker |
| 5,212,672 A | | 5/1993 | Loisch et al. |
| 5,230,629 A | * | 7/1993 | Buschke ....................... 434/236 |
| 5,304,212 A | | 4/1994 | Czeisler et al. |
| 5,311,877 A | * | 5/1994 | Kishi ........................... 600/545 |
| 5,343,121 A | | 8/1994 | Terman et al. |
| 5,433,223 A | | 7/1995 | Moore-Ede et al. |
| 5,515,477 A | * | 5/1996 | Sutherland .................... 706/41 |
| 5,524,101 A | | 6/1996 | Thorgersen et al. |
| 5,545,192 A | | 8/1996 | Czeisler et al. |
| 5,589,741 A | | 12/1996 | Terman et al. |
| 5,846,206 A | | 12/1998 | Bader |
| 5,911,581 A | * | 6/1999 | Reynolds et al. ............. 434/236 |
| 5,928,133 A | | 7/1999 | Halyak |
| 6,070,098 A | | 5/2000 | Moore-Ede et al. |
| 6,186,145 B1 | * | 2/2001 | Brown ........................... 128/897 |
| 6,236,622 B1 | | 5/2001 | Blackman |
| 6,241,686 B1 | | 6/2001 | Balkin et al. |
| 6,350,275 B1 | | 2/2002 | Vreman et al. |
| 6,419,629 B1 | | 7/2002 | Balkin et al. |
| 6,527,715 B2 | | 3/2003 | Balkin et al. |
| 6,553,252 B2 | | 4/2003 | Balkin et al. |
| 6,579,233 B2 | | 6/2003 | Hursh |
| 6,626,676 B2 | * | 9/2003 | Freer ............................. 434/236 |
| 6,712,615 B2 | * | 3/2004 | Martin ........................... 434/236 |
| 6,740,032 B2 | | 5/2004 | Balkin et al. |
| 6,743,167 B2 | | 6/2004 | Balkin et al. |
| 6,842,737 B1 | | 1/2005 | Stiles et al. |
| 6,894,606 B2 | | 5/2005 | Forbes et al. |
| 7,085,726 B1 | | 8/2006 | Galperin et al. |
| 7,207,938 B2 | | 4/2007 | Hursh |
| 7,672,802 B2 | | 3/2010 | Foreman |
| 2003/0013943 A1 | | 1/2003 | Hursh |
| 2005/0015122 A1 | | 1/2005 | Mott et al. |
| 2005/0105682 A1 | | 5/2005 | Heumann et al. |
| 2005/0177066 A1 | * | 8/2005 | Aharonson ................... 600/559 |
| 2009/0112617 A1 | * | 4/2009 | Jung et al. ........................ 705/2 |
| 2010/0009325 A1 | * | 1/2010 | Afanasiev et al. ............ 434/236 |

OTHER PUBLICATIONS

Kim, H. et al., "Sleep-Disordered Breathing and Psychomotor Vigilance in a Community-Based Sample", Sleep, vol. 30, No. 10, 2007, pp. 1309-1316.

Kribbs, N. et al., "Effects of One Night without Nasal CPAP Treatment on Sleep and Sleepiness in Patients with Obstructive Sleep Apnea", AM Rev Dis, vol. 147, 1993, pp. 1162-1168.

Lim, J. et al., "Sleep Deprivation and Vigilant Attention", Annals of the New York Academy of Sciences 1129, 2008, pp. 305-322.

Lim, J. et al., "Imaging brain fatigue from sustained mental workload: ASL perfusion study of the time-on-task effect", Neuroimage 49, 2010, pp. 3426-3435.

Lim, J. et al., "Sleep Deprivation Impairs Object-Selective Attention: A View from the Ventral Visual Cortex", PLoS ONE www.plosone.org, Feb. 2010, vol. 5, Issue 2, e9087, pp. 1-9.

Lim, J. et al., "A Meta-Analysis of the Impact of Short-Term Sleep Deprivation on Cognitive Variables", Psychological Bulletin, vol. 136, No. 3, 2010, pp. 375-389.

Luik, A. et al., "Inter-Individual Differences in Performance on a Letter Verbal Fluency Task During Sleep Deprivation", NSWO 19, 2008, pp. 105-108.

Maislin, G. et al., "A Survey Screen for Prediction of Apnea", Sleep, vol. 18, No. 3, 1995, pp. 158-166.

Mallis, M. et al., "Summary of the Key Features of Seven Biomathematical Models of Human Fatigue and Performance", Aviation, Space, and Environment Medicne, vol. 75, No. 3, Section II, Mar. 2004, pp. A4-A14.

McCauley, P. et al., "A new mathematical model for the homeostatic effects of sleep loss in neurobehavioral performance", Journal of Theoretical Biology 256, 2009, pp. 227-239.

Mitler, M. et al., "Catastrophes, Sleep, and Public Policy: Consensus Report", Sleep, vol. 11, No. 1, 1988, pp. 100-109.

Moest, E., "On the relationship between inter-individual differences in performance impairment from sleep loss and inter-individual differences in sleep architecture", 2003, pp. 55-58.

Mollicone, D. et al., "Optimizing sleep/wake schedules in space: Sleep during chronic nocturnal sleep restriction with and without diurnal naps", ACTA Astronautica, vol. 60, 2007, p. 354-361.

Mollicone, D. et al., "Response surface mapping of neurobehavioral performance: Testing the feasibility of split sleep schedules for space operations", ACTA Astronautica, vol. 63, 2008, pp. 833-840.

Mollicone, D. et al., "Time of day effects on Neurobehavioral performance during chronic sleep restriction", Aviation, Space, and Environmental Medicine, vol. 81, No. 1, Aug. 2010, pp. 735-744.

Mullington, J. et al., "Sleep loss reduces diurnal rhythm amplitude of leptin in healthy men", Journal of Neuroendocrinology, vol. 15, 2003, pp. 851-854.

Neri, D. et al., "Controlled Breaks as a Fatigue Countermeasure on the Flight Deck", Aviation, Space, and Environmental Medicine, vol. 73, No. 7, Jul. 2002, pp. 654-664.

Olofsen, D. et al., "Nonlinear Mixed-Effects Modeling: Individualization and Prediction", Aviation, Space, and Environmental Medicine, vol. 75, No. 3, Section II, Mar. 2004, pp. A134-A140.

Pack, A. et al., "Characteristics of crashes attributed to the driver having fallen asleep", Accid. Anal. and Prev., vol. 27, No. 6, 1995, pp. 769-775.

Pack, A. et al., "Impaired performance in commercial drivers: Role of sleep apnea and short sleep duration", Am J Respir Crit Care Med, vol. 174, 2006, pp. 446-454.

Pakola, S. et al., "Driving and Sleepiness: Review and regulations and guidelines for commercial and noncommercial drivers with sleep apnea and narcolepsy", Sleep, col. 18, No. 9, 1995, pp. 787-796.

Powell, N. et al., "A Comparative Model: Reaction Time Performance in Sleep-Disordered Breathing Versus Alcohol-Impaired Controls", The Larynoscope, vol. 109, Oct. 1999, pp. 1648-1654.

Rangan, S., "Integrated Fatigue Modeling in Crew Rostering and Operations", FEDEX Express Flight Operations, 2011, pp. 1-10.

Rogers, N. et al., "Shiftwork, Circadian Disruption and Consequences", Clinical Focus, Primary Psychiatry, vol. 9, No. 8, Aug. 2002, pp. 50-56.

Rogers, N. et al., "Potential Action of Melatonin in Insomnia", Sleep, vol. 26, No. 8, 2003, pp. 1058-1059.

Rogers, A. et al., "The Working Hours of Hospital Staff Nurses and Patient Safety", Health Affairs, vol. 23, No. 4, Jul./Aug. 2004, pp. 202-212.

Rogers, N. et al., "Caffeine: Implications for Alertness in Athletes", Clinics in Sports Medicine, vol. 24, 2005, pp. e1-e13.

Rogers, N. et al., "Interaction of chronic sleep restriction and circadian system in humans", J. Sleep Res., 2008, pp. 1-6.

Rosekind, M. et al., "From Laboratory to Flightdeck: Promoting Operational Alertness", The Royal Aeronautical Society, 1997, pp. 7.1-7.14.

Scott, L. et al., "The Relationship between Nurse Work Schedules, Sleep Duration, and Drowsy Driving", Sleep, vol. 30, No. 12, 2007, pp. 1801-1807.

Smith-Coggins, R. et al., "Rotating Shiftwork Schedules: Can We Enhance Physician Adaptation to Night Shifts?", Acad. Emerg. Med., vol. 4, 1997, pp. 951-961.

Stakofsky, A.B. et al., "Candidate Predictions of Vulnerability to Sleep Deprivation", 2004, p. 80-83.

Tucker, A. et al., "Trait interindividual differences in the sleep physiology of healthy young adults", J. Sleep Res., vol. 16, 2007, pp. 170-180.

Van Dongen, H. et al., "Circadian phase delay during 88-hour sleep deprivation in dim light: differences among body temperature, plasma melatonin and plasma cortisol", 2000, pp. 33-36.

Van Dongen, H. et al., "Caffeine eliminates sleep inertia after awakening from reduced sleep", 2000, pp. 1-23.

(56) References Cited

OTHER PUBLICATIONS

Van Dongen, H. et al., "A mixed regression model of cumulative sleep debt in chronic sleep restriction", Sleep-Wake, Research in the Netherlands, vol. 12, 2001, pp. 31-33.
Van Dongen, H. et al., "Investigating the interaction between the homeostatic and circadian processes of sleep-wake regulation for the prediction of waking neurobehavioural performance", J. Sleep Res., vol. 12, 2003, pp. 181-187.
Van Dongen, H. et al., "The Cumulative Cost of Additional Wakefulness: Dose-Response Effects on Neurobehavioral Functions and Sleep Physiology From Chronic Sleep Restriction and Total Sleep Deprivation", Sleep, vol. 26, No. 2, 2003, pp. 117-126.
Van Dongen, H. et al., "Sleep debt: Theoretical and empirical issues", Sleep and Biological Rhythms, vol. 1, 2003, pp. 5-13.
Van Dongen, H. et al., "Systematic Interindividual Differences in Neurobehavioral Impairment from Sleep Loss: Evidence of Trait-Like Differential Vulnerability", Sleep, vol. 27, No. 3, 2004, pp. 423-433.
Van Dongen, H. et al., "Circadian Rhythms in Sleepiness, Alertness, and Performance", Chronobiology, 2005, pp. 435-443.
Van Dongen, H. et al., "Sleep, Circadian Rhythms, and Psychomotor Vigilance", Clinics in Sports Medicine, vol. 24, 2005, pp. 237-249.
Van Dongen, H. et al., "Optimization of Biomathematical Model Predictions for Cognitive Performance Impairment in Individuals: Accounting for Unknown Traits and Uncertain States in Homeostatic and Circadian Processes", Sleep, vol. 30, No. 9, 2007, pp. 1129-1143.
Van Dongen, H. et al., "The Efficacy of a Restart Break for Recycling with Optimal Performance Depends Critically on Circadian Timing", Sleep, vol. 34, No. 7, 2011, pp. 1-13.
Varkevisser, M. et al., "Physiological Indices in Chronic Insomnia During a Constant Routine: The Role of Hyperarousal", 2004, pp. 96-99.
Varkevisser, M. et al., "Chronic Insomnia and Ambulatory Daytime Functioning", NSWO, vol. 16, 2005, pp. 171-176.
Vitellaro, A. et al., "Neurobehavioral Performance Under Varying Workload Conditions During Repeated Exposure to Sleep Deprivation", 2003, pp. 106-109.
Weaver, T. et al., "Night-To-Night Variability in CPAP Use Over the First Three Months of Treatment", Sleep, vol. 20, No. 4, 1997, pp. 278-283.
Weaver, T. et al., "An Instrument to Measure Functional Status Outcomes for Disorders of Excessive Sleepiness", Sleep, vol. 20, No. 10, 1997, pp. 835-843.
Weaver, T. et al., "Self-Efficacy in Sleep Apnea: Instrument Development and Patient Perceptions of Obstructive Sleep Apnea Risk, Treatment Benefit, and Volition to Use Continuous Positive Airway Pressure", Sleep, vol. 26, No. 6, 2003, pp. 727-732.
Weaver, T. et al., "Relationship Between Hours of CPAP Use and Achieving Normal Levels of Sleepiness and Daily Functioning", Sleep, vol. 30, No. 6, 2007, pp. 711-719.
Webber, M. et al., "Introversion, Type A Personality, and Resilience to Cognitive Impairrment from Sleep Loss", NSWO, vol. 18, 2007, pp. 131-134.
Gunzelmann, G. et al., "A Neurobehaviorally Inspired ACT-R Model of Sleep Deprivation: Decreased Performance in Psychomotor Vigilance", pp. 857-862.
Van Dongen, H.P.A. et al., "Optimization of biomathematical model predictions for cognitive performance impairment in individuals: accounting for unknown traits and uncertain states in homeostatic and circadian processes", Sleep, vol. 30, No. 9, Sep. 2007, pp. 1129-1143.
Kronauer, R.E., et al., "Uncovering physiological mechanisms of circadian rhythms and sleep/wake regulation through mathematical modeling", Journal of Biological Rhythms, vol. 22, No. 3, Jun. 2007, pp. 233-245.
Czeisler et al.; Stability, Precision, and Near-24-Hour Period of the Human Circadian Pacemaker; Science, vol. 284, No. 5423 (1999), pp. 2177-2181.
Czeisler et al.; Bright Light Resets the Human Circadian Pacemaker Independent of the Timing of the Sleep-Wake Cycle; Science, vol. 233, No. 4764 (Aug. 1986), pp. 667-671.
Jewett et al.; Revised Limit Cycle Oscillator Model of Human Circadian Pacemaker; Journal of Biological Rhythms, vol. 14, No. 6 (1999), pp. 493-499.
Jewett et al.; Phase-Amplitude Resetting of the Human Circadian Pacemaker via Bright Light: A Further Analysis; Journal of Biological Rhythms,vol. 9,Nos. 3-4(1994),pp. 295-314.
Czeisler et al.; Entrainment of Human Circadian Rhythms by Light-Dark Cycles: A Reassessment; Photochemistry and Photobiology, vol. 34, No. 2 (Aug. 1981), pp. 239-247.
Huzmezan et al.;Reconfigurable Flight Control of a High Incidence Research Model . . . ;UKACC Intl. Conf. on Control '98, Sep. 1998,Conf. publ. No. 455,IEE 1998, pp. 1169-1174.
Jewett et al; Light-Induced Suppression of Endogenous Circadian Amplitude in Humans; Nature, vol. 350, No. 6313 (Mar. 1991), pp. 59-62.
Khalsa et al.; The Timing of the Human Circadian Clock is Accurately Represented by the Core Body . . . ; Journal of Biological Rhythms, vol. 15, No. 6 (Dec. 2000), pp. 524-530.
Kronauer et al.;Mathematical Model of the Human Circadian System with Two Interacting Oscillators; American Journal of Physiology; vol. 242, No. 1 (Jan. 1982), pp. R3-R17.
Shanahan et al.; Melatonin Rhythm Observed Throughout a Three-Cycle Bright-Light Stimulas . . . ; Journal of Biological Rhythms, vol. 14, No. 3 (Jun. 1999), pp. 237-253.
Wyatt et al.; Circadian Temperature and Melatonin Rhythms, Sleep and Neurobehavioral . . . ; American Journal of Physiology, vol. 277, No. 4 (Oct. 1999), pp. R1152-R1163.
Waterhouse et al.; Estimates of the Daily Phase and Amplitude of the Endogenous Component of the Circadian . . . ; Biological Rhythm Research 2000, vol. 31, No. 1, pp. 88-107.
Richard E. Kronauer; A Model for the Effect of Light on the Human "Deep" Circadian Pacemaker; Sleep Research, 16(621), 1987.
MBI Pulsar Presentation, Oct. 27, 2006.
Mott, Christopher et al., "Modifying Circadian Pacemaker Using Model Based Predictive Control," Proceedings of the 2003 American Control Conference, Denver, Colorado, Jun. 4, 2003, pp. 453-458.
Measuring Light Intensity, Reference Note 50, D.R. Wulfingoff 1999.
www.cybercollege.com/tvp029.htm, Dec. 26, 2003, Module 29 "Light Intensity".
Rawlings, James B., "Tutorial: Model Predictive Control Technology," Proceedings of the American Control Conference, San Diego, California, Jun. 2009, pp. 662-676.
Van Dongen, H.P.A. et al., "Mixed-Model Regression Analysis and Dealing with Interindividual Differences," Methods in Enzymology, vol. 384, pp. 139-171.
Olofsen, Erik et al., "Population Pharmacokinetics/Pharmacodynamics of Anesthetics," The AAPS Journal 2005; 7 (2) Article 39, pp. E238-E389.
Minto, Charles et al., "Expanding clinical applications of population pharmacodynamic modelling," Br J Clin Pharmacol 1998; 46: 321-333.
Van Dongen, H.P.A. et al., "Dealing with Inter-Individual Differences in the Temporal Dynamics of Fatigue and Performance: Importance and Techniques," Aviation, Space, and Environmental Medicine; vol. 75, No. 3, Section II, Mar. 2004, pp. A147-A154.
Olofsen, Erik et al., "Nonlinear Mixed-Effects Modeling: Individualization and Prediction," Aviation, Space, and Environmental Medicine; vol. 75, No. 3. Section II, Mar. 2004.
Jonsson, E.N. et al., "Nonlinearity Detection: Advantages of Nonlinear Mixed-Effects Modeling,"AAPS PharmSci 2000; 2(3) article 32, pp. 1-10.
Gentilini, Andrea et al., "Multitasked Closed-Loop Control in Anesthesia," IEEE Engineering in Medicine and Biology, Jan./Feb. 2001, pp. 39-53.
Doufas, Anthony G. et al., "Induction Speed Is Not a Determinant of Propofol Pharmacodynamics," Anesthesiology, V 101, No. 5, Nov. 2004, pp. 1112-1121.

(56) References Cited

OTHER PUBLICATIONS

Dinges, David F., "Critical Research Issues in Development of Biomathematical Models of Fatigue and Performance," Aviation, Space, and Environmental Medicine, vol. 75, No. 3, Section II, Mar. 2004, pp. A181-A191.

Ihler, A., "Kernel density estimation toolbox for MATLAB," http://www.ics.uci.edu/ihler/code/kde.html, 2003.

Morari et al., "Model Predictive Control Toolbox for Use with MATLAB", Oct. 1998.

Avinash, D. et al., "Parameter Estimation for a Biomathematical Model of Psychomotor Vigilance Performance Under Laboratory Conditions of Chronic Sleep Restriction", Sleep-Wake: Research in the Netherlands, vol. 16, 2005, pp. 39-42.

Banks, S. et al., "Behavioral and Physiological Consequences of Sleep Restriction", Journal of Clinical Sleep Medicine, 2007, pp. 519-528.

Banks, S. et al., "Neurobehavioral Dynamics Following Chronic Sleep Restriction: Dose-Response Effects of One Night for Recovery", Sleep, vol. 33, No. 8, 2010, pp. 1013-1026 & S1-S3.

Basner, M. et al., "Effects of Night Work, Sleep Loss and Time on Task on Simulated Threat Detection Performance", Sleep, vol. 31, No. 9, 2008, pp. 1251-1259.

Basner, M. et al., "American Time Use Survey: Sleep Time and Its Relationship to Waking Activities", Sleep, vol. 30, No. 9, 2007, pp. 1085-1095.

Basner, M. et. al., "Dubious Bargain: Trading Sleep for Leno & Letterman", Sleep, vol. 32., No. 6, 2009, pp. 747-752.

Baynard, M. et. al., "Systematic Inter-Individual Differences in Sleep Stage Percentages", 2004, pp. 16-18.

Blaauw, M. et. al., "Trait-like Inter-individual Differences in Sleep Cycle Duration", 2002, p. 16-19.

Buysse et. al., "Sleep, Fatigue, and Medical Training: Setting and Agenda for Optimal Learning and Patient Care", Sleep, vol. 26, No. 2, 2003, pp. 218-225.

Chaumet, G. et. al., "Confinement and Sleep Deprivation Effects on Propensity to Take Risks", Aviation, Space, and Environmental Medicine, vol. 80, No. 2, Feb. 2009, pp. 73-80.

Chee, M. et. al., "Functional imaging of working memory following normal sleep and after 24 and 35 h of sleep deprivation: Corelations of fronto-parietal activation and performance", Neuroimage 31, 2006, pp. 419-428.

Chee, M. et. al., "Lapsing during Sleep Deprivation Is Associated with Distributed Changes in Brain Activation", The Journal of Neuroscience, May 21, 2008, pp. 5519-5528.

Chugh, D. et al., "Neurobehavioral Consequences of Arousals", Sleep, vol. 19, No. 10, 1996, pp. 000-000.

Czeisler, C. et al., "Modafinil for Excessive Sleepiness Associated with Shift-Work Sleep Disorder", The New England Journal of Medicine, Aug. 4, 2005, pp. 476-486.

Dinges, David F., "The Nature and Timing of Sleep", Transitions & Studies of the College of Physicians of Philidelphie, Ser. 5, vol. 6, No. 3 (1984), pp. 177-206.

Dinges, D. et al., "Assessing performance upon abrupt awakening from naps during quasi-continuous operations", Behavior Research Methods, Instruments, & Computers, 1985, pp. 37-45.

Dinges, D. et al., "Microcomputer analyses of performance on a portable, simple visual RT task during sustained operations", Behavior Research Methods, Instruments, & Computers, 1985, pp. 652-655.

Dinges, D. et al., "Napping to Sustain Performance and Mood: Effect of Circadian Phase and Sleep Loss", paper presented at the Seventh International Symposium on Night-and Shiftvvork, Sep. 18-21, 1985, Austria.

Dinges, David F., "Differential Effects of Prior Wakefulness and Circadian Phase on Nap Sleep", Electroencephalography and Clinical Neurophysiology, 1986, pp. 224-227.

Dinges, D. et al., "Temporal Placement of Nap for Alertness: Contributions of Circadian Phase and Prior Wakefulness", Sleep, 10(4), 1987, pp. 313-329.

Dinges, D. et al., "The benifits of a nap during prolonged work and wakefulness", Work & Stress, 1988, vol. 2, No. 2, pp. 139-153.

Dinges, D. et al., "Comparison of the Effects of Alcohol and Sleepiness on Simple Reaction Time Performance: Enhanced Habituation as a Common Process", Alcohol, Drugs and Driving, 1990, vol. 5, No. 4/vol. 6, No. 1, pp. 1-11.

Dinges, David F., "An overview of sleepiness and accidents", European Sleep Research Society, 1995, pp. 4-14.

Dinges, D. et al., "Cumulative Sleepiness, Mood Disturbance, and Psychomotor Vigilance Performance Decrements During a Week of Sleep Restricted to 4-5 Hours per Night", Sleep, 1997, pp. 264-277.

Dinges, D. et al., "Future Considerations for Models of Human Neurobehavioral Function", Journal of Biological Rhythms, vol. 14, No. 6, Dec. 1999, pp. 121-124.

Dinges, D. et al., "Recognizing Problem Sleepiness in Your Patients", American Family Physician, Feb. 15, 1999, Web Archive.

Dinges, D. et al., "Cumulative Sleep Loss in Space Flight: Neurobehavioral Consequences and Countermeasures", International Astronautical Federation, 2001, pp. 1-7.

Dinges, D. et al. "Effects of modafinil on sustained attention performance and quality of life in OSA patients with residual sleepines while being treated with nCPAP", Sleep Medicine, Mar. 28, 2003, pp. 1-10.

Dinges, David F., "Critical Research Issues in Development of Biomathematical Models of Fatigue and Performance", Aviation, Space, and Environmental Medicine, vol. 75, No. 3, Section II, Mar. 2004, pp. A181-A191.

Dinges, D. et al., "Pilot Test of Fatigue Management Techniques", TRB 2005 Annual Meeting, Paper # 05-1234.

Dinges, David F., "Cocoa Flavanols, Cerebral Blood Flow, Cognition, and Health: Going Forward", J Cardiovasc Pharmacol, vol. 00, No. 00, 2006, Article No. 200260, pp. 1-3.

Dinges, D. et al., "Pharmacodynamic effects on alertness of single doses of armodafinil in healthy subjects during a nocturnal period of acute sleep loss", Current Medical Research and Opinions, vol. 22, No. 1, 2006, pp. 159-167.

Dinges, D. et al., "Monitoring of Facial Stress during Space Flight: Optical Computer Recognition Combining Discriminative and Generative Methods", 2007, pp. 1-27.

Doran, S.M. et al., "Sustained Attention Performance During Sleep Deprivation: Evidence of State Instability", Archives Italiennes De Biologie, 139, 2001, pp. 253-267.

Drummond, S. et al., "The Neural Basis of Psychomotor Vigilance Task", Sleep, vol. 28, No. 9, 2005, pp. 1059-1068.

Durmer, J. et al., "Neurocognitive Consequences of Sleep Deprivation", Seminars in Neurology, vol. 25, No. 1, 2005, pp. 117-129.

Findley, L. et al., "Time-on-task Decrements in "Steer Clear" Performance of Patients with Sleep Apnea and Narcolepsy", Sleep, Vo. 22, No. 6, 1999, pp. 804-809.

Goel, N. et al., "Neurocognitive Consequences of Sleep Deprivation", Semin Neurol, 2009, pp. 320-339.

Goel, N. et al., "PER3 Polymorphism Predicts Cumulative Sleep Homeostatic but Not Neurobehavioral Changes to Chronic Partial Sleep Deprivation", PLoS ONE www.plosone.org, Jun. 2009, vol. 4, Issue 6, pp. 1-13.

Gooneratne, N., et al., "Consequences of Comorbid Insomnia Symptoms and Sleep-Related Breathing Disorder in Elderly Subjects", Arch Intern Med., vol. 166, Sep. 18, 2006, pp. 1732-1738.

Grace, R. et al., "The Carnege Mellon Trucksim: A Tool to Improve Driving Safety", IEEE, 0-7803-5086-3, 1998, pp. 135-1-135-8.

Gross, J. et al., "Computational Modeling of the Combined Effects of Circadian Rhythm and Sleep Deprivation", 2006, pp. 297-302.

Gunzelmann, G. et al., "Understanding Decrements in Knowledge Access Resulting from Increased Fatigue", Proceedings of the Twenty-Ninth Annual Meeting of the Cognitive Science Society, 2007, pp. 329-334.

Gunzelmann, G. et al., "Individual Differences in Sustained Vigilant Attention: Insights from Computational Cognitive Modeling", Proceedings of the Thirtieth Annual Meeting of the Cognitive Science Society, 2008, pp. 2017-2022.

Gunzelmann, G. et al., "Examining Sources of Individual Variation in Sustained Attention", 2009, pp. 608-613.

(56) References Cited

OTHER PUBLICATIONS

Gunzelmann, G. et al., "Sleep Deprivation and Sustained Attention Performance: Integrating Mathematical and Cognitive Modeling", Cognitive Science 33, 2009, pp. 880-910.

Hoffman, J. et al., "Time of Day and Sleep Inertia Effects on Cognitive Performance and Sleepiness During Chronic Sleep Restriction", NSWO 16, 2005, pp. 75-78.

Jewett, M. et al., "Dose-response Relationship Between Sleep Duration and Human Psychomotor Vigilance and Subjective Alertness", Sleep, vol. 22, No. 2, 1999, pp. 171-179.

Kelly, S. et al., "Flight Controller Alertness and Performance During Spaceflight Shiftwork Operations", The Society for Human Performance in Extreme Environments (HPEE), vol. 3, No. 1, Sep. 1998, pp. 100-106.

\* cited by examiner

SYSTEMS AND METHODS FOR EVALUATING NEUROBEHAVIOURAL PERFORMANCE FROM REACTION TIME TESTS

RELATED APPLICATIONS

This application claims priority from U.S. application No. 61/215,571 filed on 7 May 2009 which is hereby incorporated herein by reference.

TECHNICAL FIELD

The technology disclosed herein is related to stimulus-response tests. Particular embodiments, provide systems and methods for evaluating neurobehavioural performance of individuals using results from reaction time tests.

BACKGROUND

Stimulus-response tests conducted on human or other animal subjects involve the presentation of stimulus events to the subject and measuring and/or recording characteristics of the stimulus and/or the subject's response. Stimulus-response tests may also involve analysis of the measured and/or recorded characteristics. Reaction-time tests represent a particular example of a stimulus-response test in which time delay between the stimulus event and the subject response is of particular interest. Reaction time tests represent a common assessment technique for evaluating human cognitive and neurobehavioural performance. Generally, reaction time tests involve: presenting a stimulus event to the subject, assessing and/or recording a time at which the stimulus event is presented, and assessing and/or recording a time at which the subject responds to the stimulus.

Stimulus-response tests (including reaction time tests) may be delivered on a wide-variety of hardware and software platforms. For example, stimulus-response tests may be administered on personal computers which include relatively common stimulus output devices (e.g. monitors, displays, speakers and/or the like) and relatively common response input devices (e.g. keyboards, computer mice, joysticks, buttons and/or the like). As another example, stimulus-response tests can be administered by dedicated hardware devices with particular stimulus output devices and corresponding response input devices.

There is a general desire to provide systems and methods for accurately analyzing the data obtained from reaction time tests.

SUMMARY

One aspect of the invention provides a method for evaluating reaction time data obtained from a stimulus-response testing system. The method involves: obtaining reaction time data, the reaction time data comprising a plurality of reaction times, each reaction time comprising an estimate of a time required for a subject to respond to a corresponding stimulus event; assigning a weight to each reaction time in the reaction time data in accordance with a weighting function, the weighting function comprising a rule that defines a mapping between reaction times and corresponding weights; and determining a weighted reaction time metric based at least in part on a sum of the weights assigned to the reaction times in the reaction time data.

Another aspect of the invention provides a system for evaluating reaction time data obtained from a stimulus-response testing system. The comprises: a controller connected to receive reaction time data, the reaction time data comprising a plurality of reaction times, each reaction time comprising an estimate of a time required for a subject to respond to a stimulus event, the controller configured to: assign a weight to each reaction time in the reaction time data in accordance with a weighting function, the weighting function comprising a rule that defines a mapping between reaction times and corresponding weights; and determine a weighted reaction time metric based at least in part on a sum of the weights assigned to the reaction times in the reaction time data.

Another aspect of the invention provides a method for evaluating the ability of a subject to perform an operational task. The method involves: providing a stimulus-response test system comprising a stimulus output device for outputting stimulus events and a response input device for receiving responses from the subject; obtaining reaction time data from the stimulus response test system, the reaction time data comprising a plurality of reaction times, each reaction time comprising an estimate of a time required for a subject to respond to a corresponding stimulus event; assigning a weight to each reaction time in the reaction time data in accordance with a weighting function, the weighting function comprising a rule that defines a mapping between reaction times and corresponding weights; determining a weighted reaction time metric based at least in part on a sum of the weights assigned to the reaction times in the reaction time data, the weighted reaction time metric correlated with the ability of the subject to perform the operational task.

Further aspects and features of specific embodiments will become apparent by reference to the drawings and by study of the following detailed description and the accompanying drawings.

BRIEF DESCRIPTION OF THE DRAWINGS

In drawings which depict non-limiting embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Aspects of the invention provide systems and methods for evaluating reaction time data obtained from a stimulus-response testing system. Particular systems and methods involve: obtaining reaction time data, the reaction time data comprising a plurality of reaction times, each reaction time comprising an estimate of a time required for a subject to respond to a corresponding stimulus event; assigning a weight to each reaction time in the reaction time data in accordance with a weighting function, the weighting function comprising a rule that defines a mapping between reaction times and corresponding weights; and determining a weighted reaction time metric based at least in part on a sum of the weights assigned to the reaction times in the reaction time data.

Systems and methods for evaluating neurobehavioural performance according to particular embodiments of the invention may work in conjunction with stimulus-response test systems and/or data (e.g. reaction time data) from such response-stimulus test systems. Stimulus-response test systems generally involve the presentation of stimulus events to the subject and measuring and/or recording characteristics of the stimulus and/or the subject's response to the stimulus. Systems and methods according to particular embodiments may be used in conjunction with reaction-time test systems and/or data from such systems. Reaction-time tests represent a particular example of a stimulus-response test in which time delay between the stimulus event and the subject response is of particular interest. Generally, reaction time tests involve: presenting a stimulus event to the subject, assessing and/or recording a time at which the stimulus event is presented, and assessing and/or recording a time at which the subject responds to the stimulus. Reaction time tests may involve assessing and/or recording a difference between the stimulus event time and the response time and interpreting such a time difference to be representative of the subject's reaction time.

Figure 1:
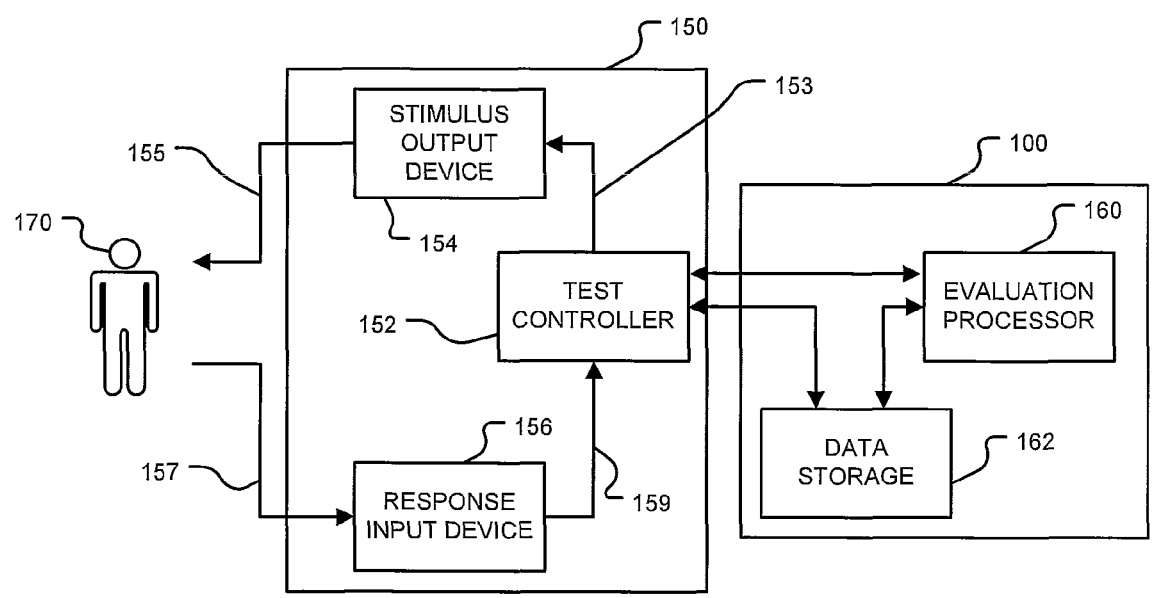
FIG. 1 is a schematic block diagram illustration of a stimulus-response test system for administering stimulus-response tests to a subject and a corresponding system for evaluating stimulus-response test results according to a particular embodiment.

Stimulus-response tests (including reaction time tests) may be delivered on a wide-variety of hardware and software platforms. By way of non-limiting example, stimulus-response tests may be administered on personal computers which include relatively common stimulus output devices (e.g. monitors, displays, speakers and/or the like) and relatively common response input devices (e.g. keyboards, computer mice, joysticks, buttons and/or the like). As a contrasting (but also non-limiting) example, stimulus-response tests can be administered by dedicated hardware devices with particularly configured stimulus output devices and corresponding particularly configured response input devices. For illustrative purposes, this description considers an exemplary stimulus-response test system 150 shown schematically in FIG. 1. Stimulus-response test system 150 includes: a test controller 152, a stimulus output device 154 and a response input device 156. In the FIG. 1 illustration, the stimulus-response test is being administered on subject 170 (also referred to as test responder 170).

In one particular exemplary embodiment, test controller 152 comprises a personal computer running suitable stimulus-response test software. In other embodiments, test controller 152 may comprise, for example, one or more suitably programmed data processors, together with suitable hardware, including, by way of non-limiting example: accessible memory, logic circuitry, drivers, amplifiers, A/D and D/A converters and like. Test controller 152 may comprise, without limitation, an embedded and/or dedicated microprocessor, a computer-on-a-chip, the CPU of a computer, any other suitable microcontroller and/or programmable logic circuitry. Test controller 152 may comprise a plurality of data processors.

Stimulus output device 154 may comprise a well known computer output device (e.g. a monitor, speakers or the like) or may comprise a specialized output device (e.g. digitally controlled light source or the like) for the purpose of implementing a particular stimulus-response test. Similarly, response input device 156 may comprise a well known computer input device (e.g. a mouse, a keyboard, a touch screen, a graphics tablet or the like) or a specialized input device (e.g. a button, a microphone, a still camera, a video camera, a force-feedback device or the like).

To administer a stimulus-response test, test controller 152 sends a control signal 153 to stimulus output device 154, causing stimulus output device 154 to generate a stimulus 155 which may be perceived by subject 170. Subject 170 (typically a human or other animal) monitors stimulus 155 for a particular stimulus event. The nature of a stimulus event may vary according to the particular stimulus-response test being conducted. By way of non-limiting example a stimulus event, may comprise: the presence/absence of stimulus 155, the transition of a characteristic (e.g. intensity, frequency or the like) of stimulus 155 across a threshold, a sequence of particular stimuli and/or the like. In response to observing a stimulus event, subject 170 responds 157 to the stimulus event using response input device 156. Typically, subject 170 is expected to respond as quickly and/or as accurately as possible when a stimulus event is presented and to avoid impulsive incorrect responses (e.g. "false starts" which involve responses where there has been no stimulus event). Response input device 156 then sends a corresponding response signal 159 to test controller 152.

Test controller 152 may measure and/or record various properties of the stimulus and response sequence. Properties of the stimulus-response sequence which may be measured and/or recorded include estimates of the time at which stimulus 155 was output to subject 170 and the time at which subject 170 responded 157. In some embodiments, these times may be estimated based on the time that test controller 152 outputs signal 153 to stimulus output device 154 and the time that test controller 152 receives response signal 159 from response input device 156. In some embodiments, the estimates based on signals 153 and 159 may be calibrated based on one or more calibration parameters representative of expected latencies between the output of signal 153 and the corresponding output of stimulus 155 and/or between response 157 and the arrival of signal 159 at test controller 152. Stimulus-response test system 150 may generate an output that comprises a sequence of one or more reaction times for subject 170, each reaction time based on a time difference between a stimulus event and a corresponding response.

Figure 3:
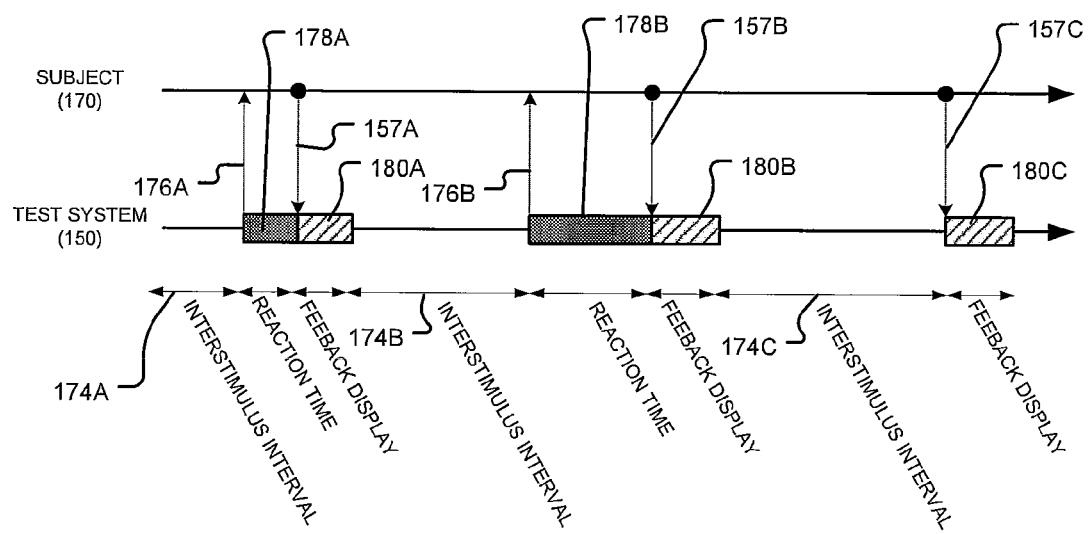
FIG. 3 is a time line sequence schematically illustrating an example stimulus-response interaction between a stimulus-response test system and a subject.

FIG. 3 is a timeline sequence schematically illustrating an example stimulus-response interaction between stimulus-response test system 150 and subject 170. Although the exemplary sequence of FIG. 3 could be generated by a variety of test types, it is assumed, for purposes of example, that stimulus-response test system 150 is administering a psychomotor vigilance task (PVT) test or a variation thereof. Such PVT tests are described, for example by Dinges, D. F. and Powell, J. W. "Microcomputer analyses of performance on a portable, simple visual RT task during sustained operations." Behavior Research Methods, Instruments, & Computers 17(6): 652-655, 1985, which is hereby incorporated herein by reference. Such PCT tests may be performed on a stimulus-response test system 150 where test controller 152 comprises a suitably programmed personal computer, stimulus output device 154 comprises a conventional computer monitor and response input device 156 comprises a conventional computer keyboard.

The illustrated timeline sequence shown in FIG. 3 begins in an interstimulus interval 172A. Interstimulus intervals 172A, 172B, 172C (collectively, interstimulus intervals 172) represent states in which a stimulus event has not been output by stimulus output device 154 and subject 170 is waiting for a next stimulus event 176A, 176B (collectively, stimulus events 176). In some embodiments, interstimulus intervals 172 are of pseudo-random duration. Test system 150 may record the times that it initiates stimulus events 176. In the particular case of the PVT test described above, subject 170 is expected to initiate a response 157A, 157B, 157C (collectively, responses 157) as soon as possible after subject 170 perceives stimulus event 176. Test system 150 may record the times when it receives responses 157 are received by test system 150. Test system may estimate reaction times 178A, 178B (collectively, reaction times 178) based on a difference between the recorded times of stimulus events 176 and corresponding responses 157. Reaction times 178 are shown shaded in the FIG. 3 illustration. Reaction times 178 may be recorded by test system 150.

In some embodiments, stimulus events 176 may comprise, or be accompanied by, the display (not shown in FIG. 3) of a timer on stimulus output device 154 or on a display device associated with test system 150. This timer may begin counting at the time of a stimulus event 176 and may stop when test system 150 receives a corresponding response 157. In some embodiments, visual feedback 180A, 180B, 180C (collectively, feedback 180) may be displayed for a period of time after responses 157 are received at test system 150. Such feedback 180 may comprise the display of reaction times 178 (e.g. a timer display that is stopped) for a period of time after responses 157 are received by test system 150. At the conclusion of each feedback period 180, a new interstimulus interval 174 may commence.

In some instances, subject 170 may initiate a response (e.g. response 157C) prior to a stimulus event 176. This may be interpreted by test system 150 to be a false start. While it is not necessary, test system 150 may provide feedback 180C indicative of such a false start situation.

Figure 4A:
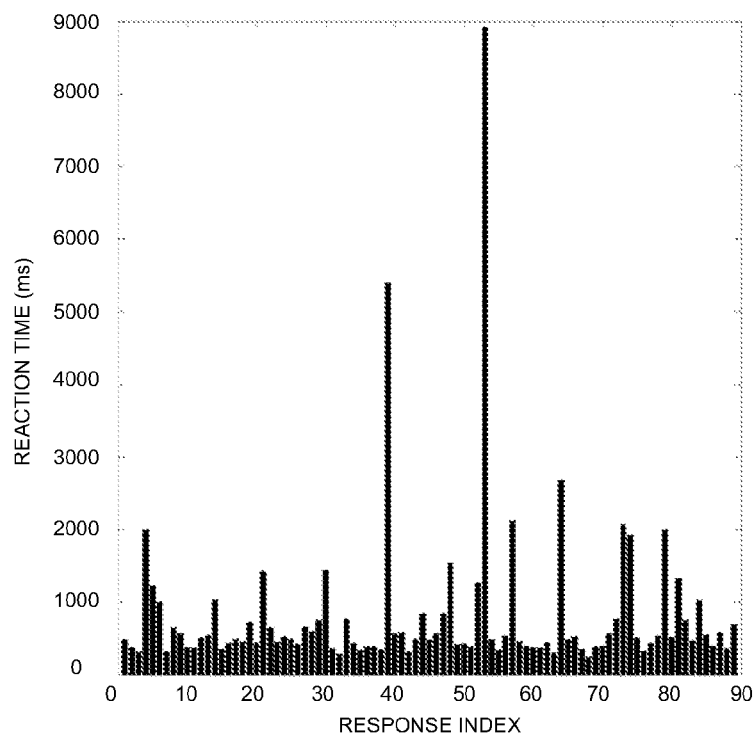
FIG. 4A is a plot of reaction time data from a typical stimulus-response test plotted as a time sequence.
Figure 4B:
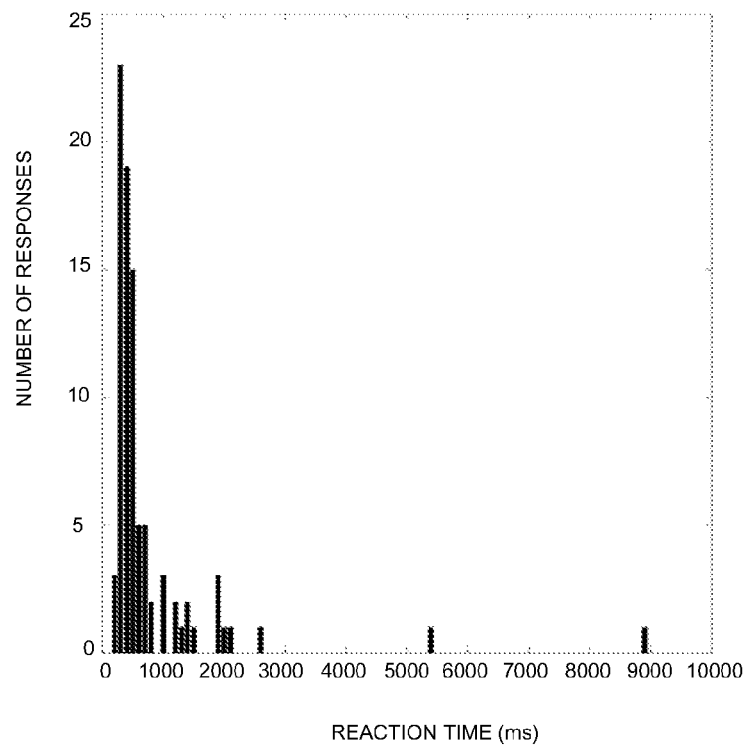
FIG. 4B is a plot of the FIG. 4A reaction time data plotted as a histogram.

In some embodiments, a particular stimulus-response test may continue for a fixed or user-configurable period of time (e.g. 2-15 minutes). In other embodiments, a stimulus-response test may have other termination criteria (e.g. a number of stimulus-response sequences, a number of reaction times 178 that fall within a range and/or the like). FIGS. 4A and 4B show plot of reaction time data for a single exemplary 10 minute PVT test. In FIG. 4A, the reaction times are shown in the sequence in which they were generated (i.e. the x-axis of the FIG. 4A plot indicates the index number of a particular stimulus-response sequence). FIG. 4B represents a histogram of the reaction time data (in ms).

In addition to test system 150, FIG. 1 also shows a schematic block diagram of a reaction time evaluation system 100. For illustrative purposes, evaluation system 100 is shown separately from test system 150 and test controller 152. This is not necessary. The components and features of evaluation system 100 may be provided by suitably configured components of test system 150. For example, as discussed above, test controller 152 may comprise a suitably programmed computer. Such a computer may also perform the functions of any or all of the components of evaluation system 100.

Evaluation system 100 comprises data storage 162 and evaluation processor 160. Reaction time data obtained by test system 150 may be passed to data storage 162. Data storage 162 may perform functions that include, by way of example, one or more of: buffering, organizing and providing permanent or semi-permanent storage for reaction time data or other data. Non-limiting examples of suitable data storage 162 include one or more of: RAM memory, hard disc drives, database storage, and external computers. Evaluation processor 160 may receive reaction time data from data storage 162. Evaluation processor 160 provides computational capabilities. Non-limiting examples of suitable evaluation processors 160 include one or more suitably programmed: data processors (e.g. microprocessors), general purpose computers, programmable logic circuits, mobile computational devices (such as a phone) and/or the like.

Figure 2:
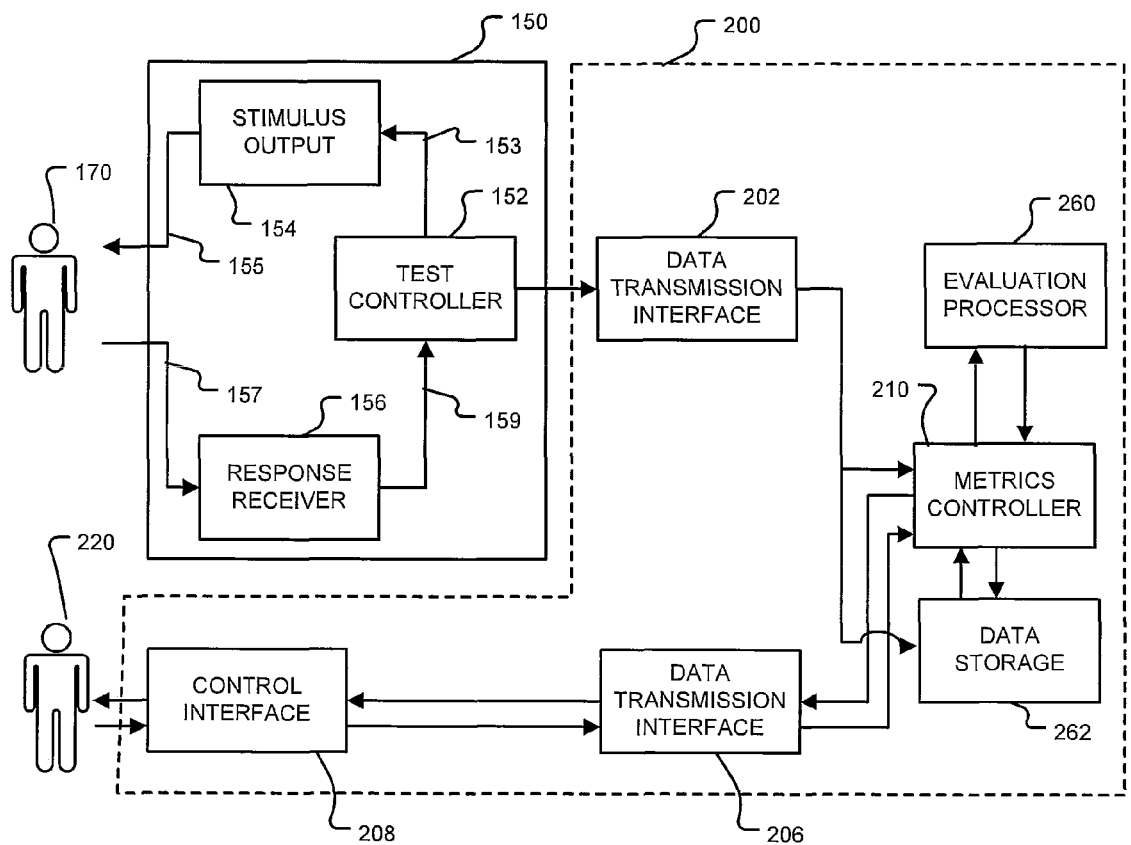
FIG. 2 is a schematic block diagram illustration of a stimulus-response test system for administering stimulus-response tests to a subject and a corresponding system for evaluating stimulus-response test results according to another embodiment.

FIG. 2 schematically illustrated a block diagram representation of an evaluation system 200 which may be used in conjunction with test system 150 according to another embodiment. Evaluation system 200 differs primarily from evaluation system 100 in that evaluation system 200 and its components are distinct from test system 150 and are operatively connected to test system 150 via data transmission interface 202. Data transmission interface 202 may comprise, for example, a network interface (e.g. a wireless network interface, an ethernet cable and/or the like), a USB connection, a serial connection, an IEEE 1394 interface (e.g. FireWire) and/or the like. Test system 150 may transmit reaction time data to metrics controller 210 and/or to data storage 262 via data transmission interface 202. In one particular exemplary embodiment, metrics controller 210 comprises a personal computer running suitable reaction time evaluation software. In other embodiments, metrics controller 210 may comprise, for example, one or more suitably programmed data processors, together with suitable hardware, including, by way of non-limiting example: accessible memory, logic circuitry, drivers, amplifiers, A/D and D/A converters and like. Metrics controller 210 may comprise, without limitation, an embedded and/or dedicated microprocessor, a computer-on-a-chip, the CPU of a computer, any other suitable microcontroller and/or programmable logic circuitry. Metrics controller 210 may comprise a plurality of data processors.

Metrics controller 210 may receive reaction time data from data transmission interface 202 and/or from data storage 262, and may communicate with a evaluation processor 260 and data storage 262. Evaluation processor 260 and data storage 262 may be similar to evaluation processor 160 and data storage 162 described above, except that evaluation processor 260 may be implemented in whole or in part by metrics controller 210 running suitable software. Metrics controller 210 may also communicate with a control interface 208 via data transmission interface 206. Data transmission interface 206 may be similar to data transmission interface 202. Data transmission interface 206 may be additional to data transmission interface 202 (as shown by way of example in FIG. 2). In other embodiments, the evaluation system 200 could contain a single data transmission interface performing the functions of both data transmission interfaces 202, 206.

Control interface 208 may provide a set of control commands that can be initiated by a user (e.g. a test administrator) 220 of evaluation system 200. Such control commands may be transmitted to metrics controller 210 via data transmission interface 206. Control commands may include, for example, a data query command, a calculate metrics command and/or the like. A data query command may include, for example, parameters referencing particular data sets. Upon receiving a data query command, metrics controller 210 may identify and retrieve particular data (e.g. queried data) from data storage 262 and may transmit such data back to control interface 208 via data transmission interface 206. A calculate metrics command may include parameters specifying properties of the type of metric to calculate and parameters identifying particular data sets. Upon receiving a calculate metrics command, metrics controller 210 may retrieve data sets from data storage 262, pass such data sets to evaluation processor 260, cause evaluation processor 260 to generate certain evaluation metrics based on the data sets, receive generated evaluation metrics from evaluation processor 260, then optionally send the generated valuation metrics to control interface 208 and/or send the generated valuation metrics to data storage 262 to be saved. By way of non-limiting example, control interface 208 may comprise a computer screen with a user input such as a keyboard and mouse, a touch screen display, a mobile phone display and buttons and/or the like.

Figure 8:
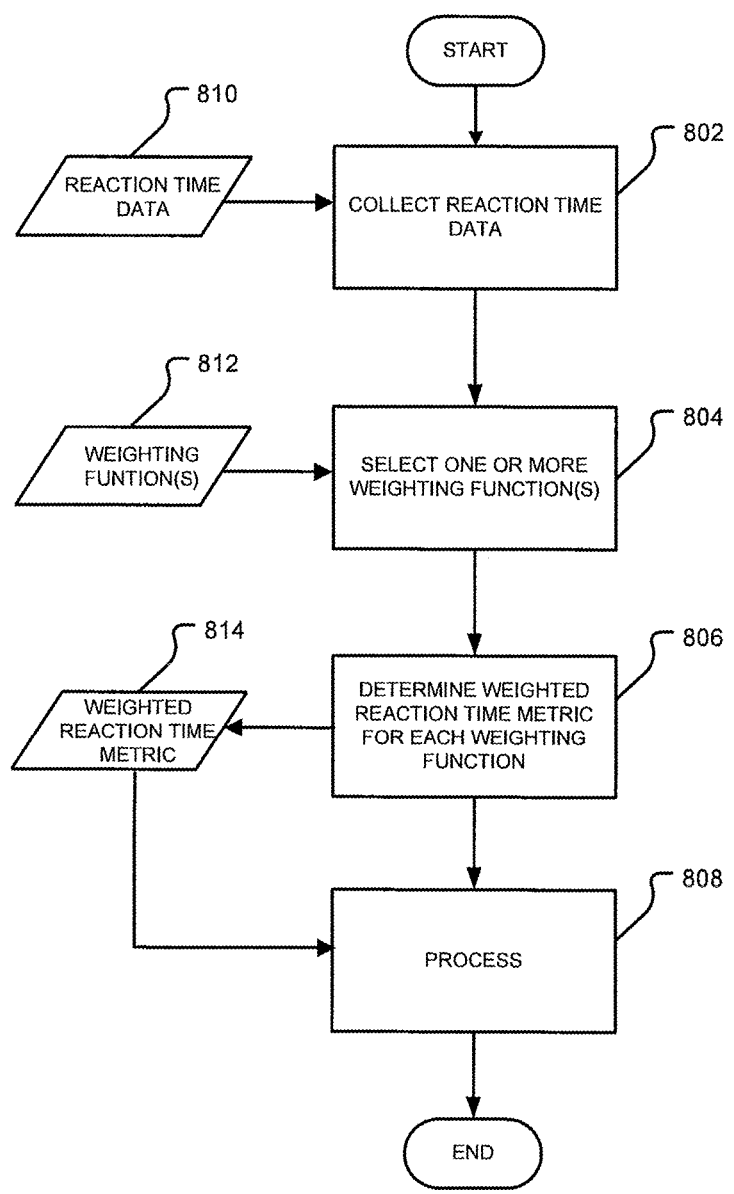
FIG. 8 is a schematic flow chart diagram illustrating a method for evaluating reaction time data from a stimulus-response test according to a particular embodiment.

FIG. 8 is a flow chart illustrating a method 800 for reaction time evaluation according to a particular embodiment. In evaluation system 100 of FIG. 1, method 800 may be performed, at least in part, by evaluation processor 160. As discussed above, evaluation processor 160 may be implemented as a part of test controller 152. In evaluation system 200 of FIG. 2, method 800 may be performed at least in part by evaluation processor 260. As discussed above, As discussed above, evaluation processor 260 may be implemented as a part of metrics controller 210. Method 800 begins in block 802 which involves obtaining reaction time data 810. Reaction time data 810 may comprise a set of values corresponding o the reaction times from a stimulus-response test—e.g. a stimulus-response test conducted by test system 150.

Method 800 then proceeds to block 804 which involves the selection of one or more weighting functions 812. A weighting function 812 can comprise any function that provides a mapping between a reaction time and a corresponding weight value. Weighting functions 812 may comprise mathematical equations, continuous functions, piece-wise functions, lookup tables and/or any other system which provides the desired mapping. Weighting functions 812 may be defined over a range that spans the range of the lowest to the highest expected or possible reaction times (e.g. 0 ms-30,000 ms) or may assign a particular rule to reaction times that are outside this range. In some embodiments, weighting functions 812 may be bounded between 0 and 1. Non-limiting examples of suitable weighting functions 812 are shown in FIGS. 5A-5G.

Figure 5A:
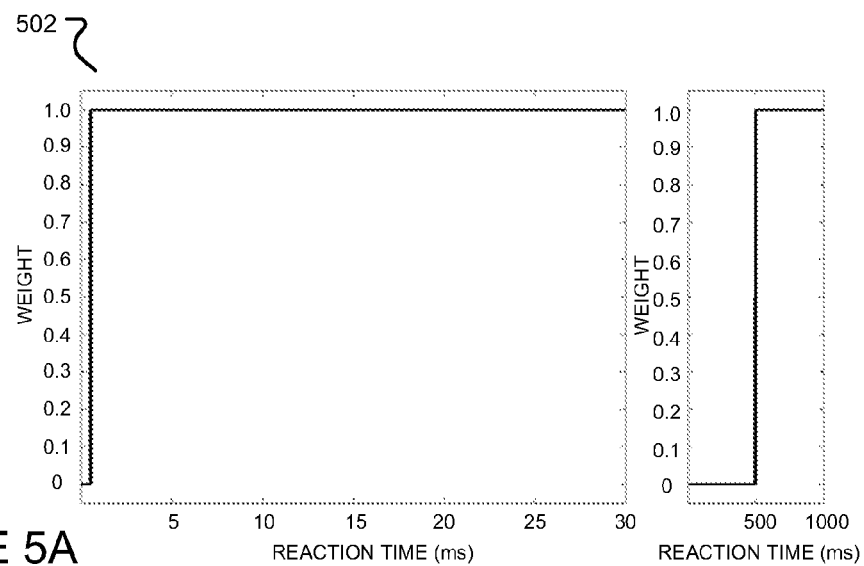
FIGS. 5A-5G show plots of exemplary reaction time weighting functions according to particular embodiments.

FIG. 5A shows a weighting function 502 incorporating a step that a assigns a weight of 0 for reaction times in a range [0, 500 ms] and 1 for reaction time in a range (500 ms, 30 s], where square brackets], [ are inclusive of the boundary and round brackets), (are exclusive of the boundary. That is, weighting function 502 assigns a weight w to a $$\text{reaction time } x \text{ according to } w(x) = \begin{cases} 0 & \text{for } 0 \le x \le 500 \text{ ms} \\ 1 & \text{for } 500 < x \le 30 \text{ s.} \end{cases}$$

Figure 5B:
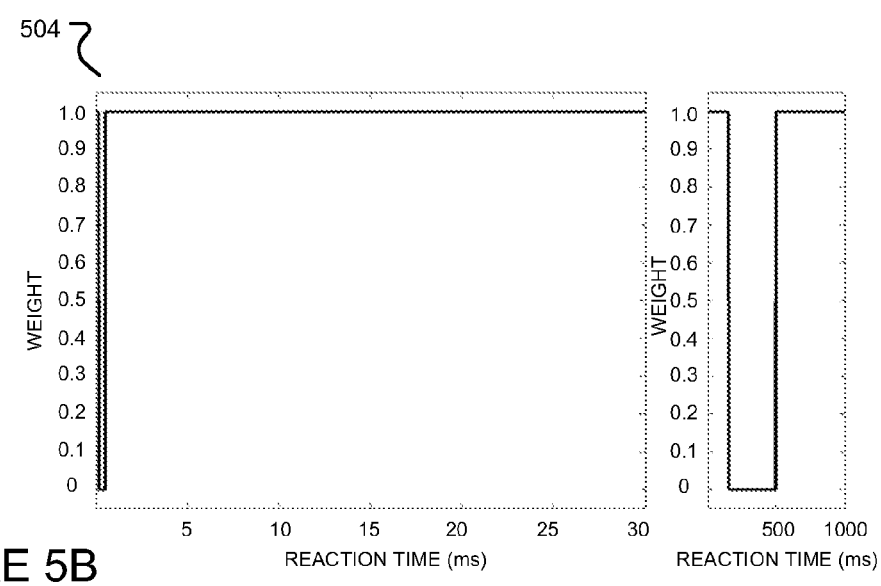

The FIG. 5A weighting function 502 may be useful to assign an undesirable weight value (e.g. 1) to reaction times which may be considered to be undesirably long (e.g. over 500 ms) and a desirable weight value (e.g. 0) to reaction times in a desired range (e.g. ≤500 ms). FIG. 5B shows a weighting function 504 incorporating two steps to assign a $$\text{weight } w \text{ to reaction times } x \text{ according to } w(x) = \begin{cases} 1 & 0 \le x \le 150 \text{ ms} \\ 0 & 150 \text{ ms} < x \le 500 \text{ ms} \\ 1 & 500 \text{ ms} < x \le 30 \text{ s.} \end{cases}$$

The FIG. 5B weighting function may be useful to assign an undesirable weight value (e.g. 1) to reaction times which may be considered to be undesirably long (e.g. over 500 ms) and to reaction times which may be considered to be false starts, because they are too low (e.g. less than or equal to 150 ms) and a desirable weight value (e.g. 0) to reaction times in a desired range (e.g. 150<x≤500 ms).

Figure 5C:
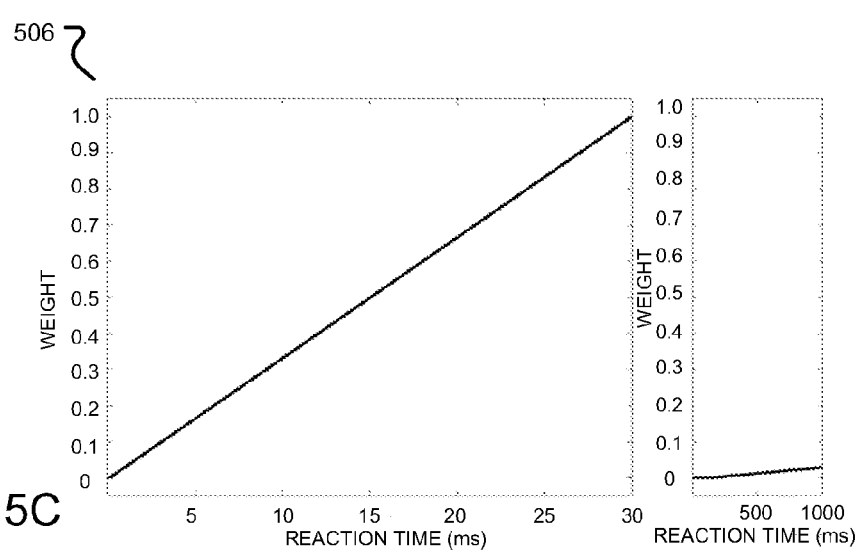
Figure 5D:
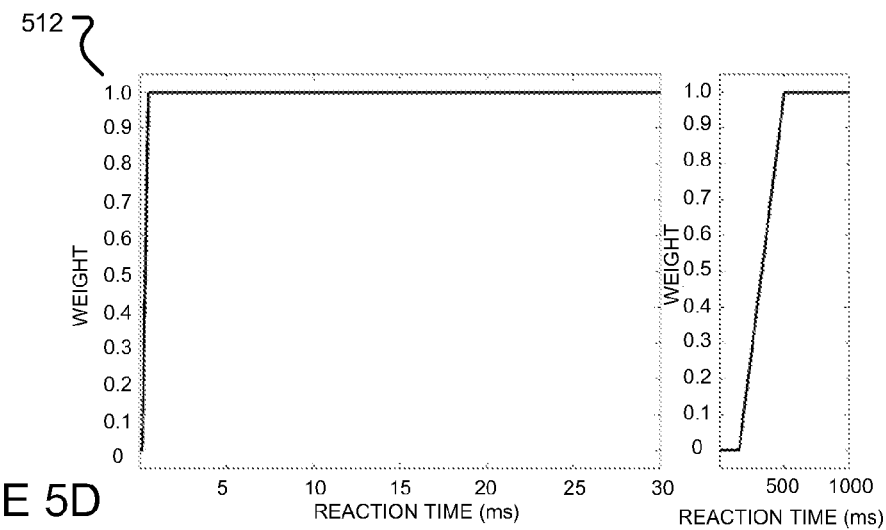
Figure 5E:
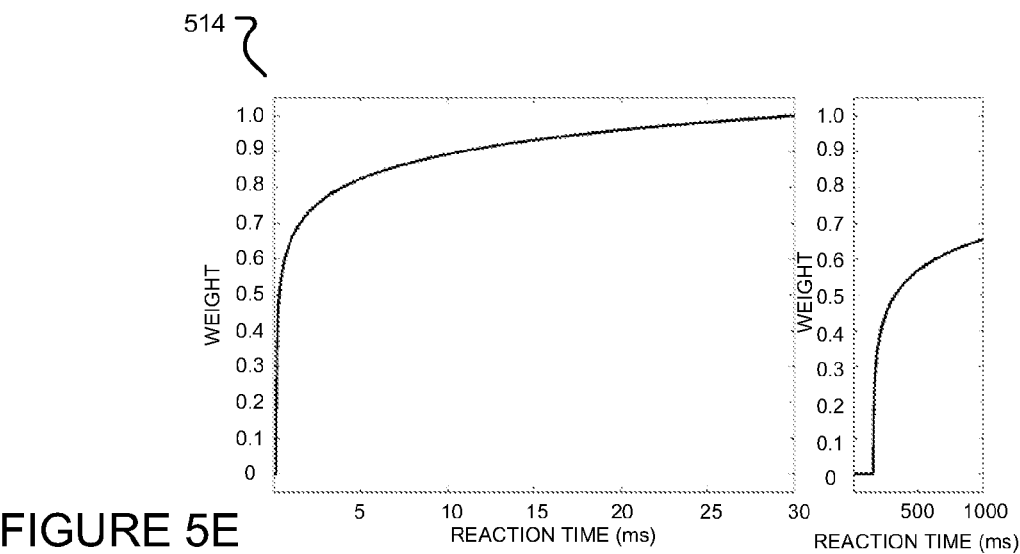
Figure 5F:
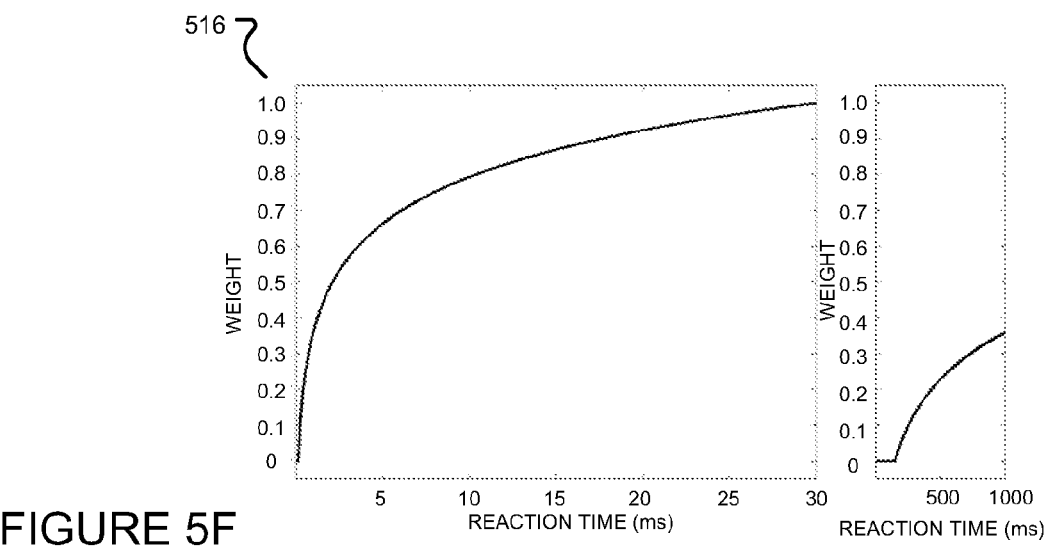

FIG. 5C shows a ramping weight function 506 which may assign relatively desirable weights to desirable (e.g. low) reaction times and undesirable weights to relatively undesirable (e.g. high) reaction times. FIG. 5D also shows a ramping weight function 512 having a different slope than weighting function 506 of FIG. 5C. FIGS. 5E and 5F depict exponential weighting functions 514, 516 having different exponential constants.

Specific weighting functions 812 (FIG. 8) may be selected in block 804 to provide metrics that are based on, or correlated with, neurobehavioural criteria or characteristics of subject 170. By way of non-limiting example, weighting functions 812 may be selected to provide metrics that are based on, or correlated with: the ability of subject 170 to perform a neurobehavioral function (e.g. the ability of subject 170 to maintain vigilant attention), the ability of subject 170 to perform an operational task (e.g. the likelihood of successfully detecting threats in a security screening process), a behavioral characteristic (e.g. subject 170 applied low effort to the test and/or subject 170 was distracted by external stimuli), or a medical condition (e.g. presence or severity of a neurodegenerative disease).

Figure 5G:
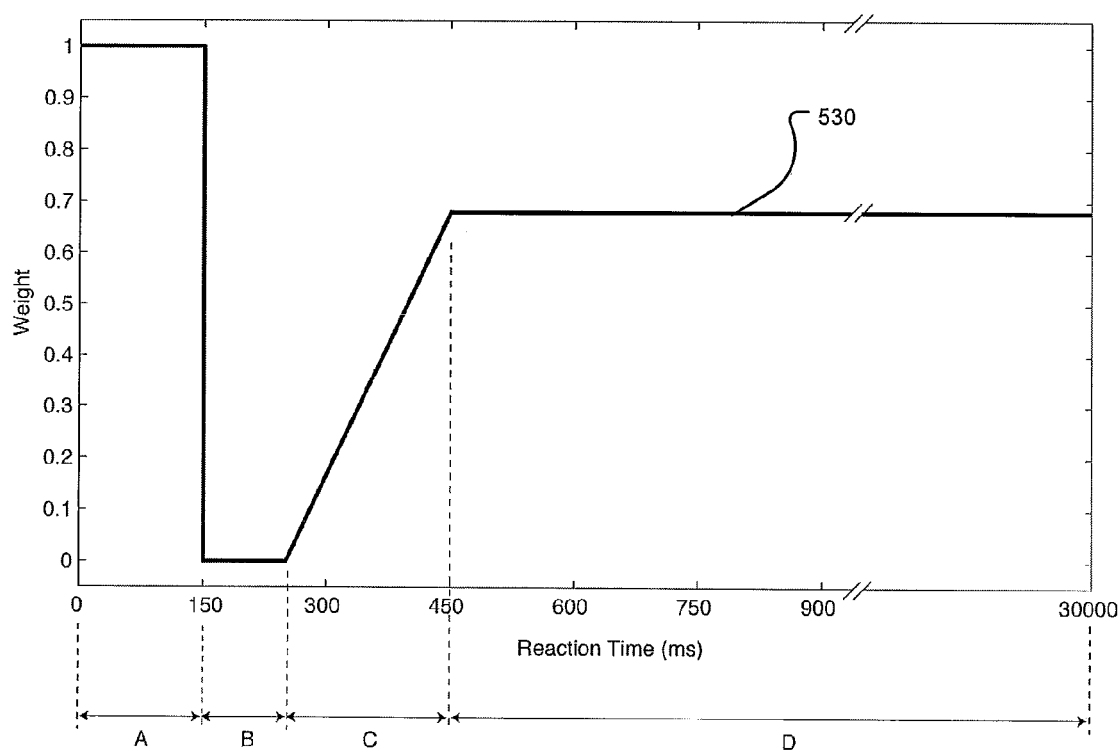

FIG. 5G depicts an exemplary weighting function 530 selected to provide a metric correlated with the ability of subject 170 to perform operational task. In the exemplary weighting function 530 of FIG. 5G, reaction times are separated into distinct regions A, B, C, and D. In the illustrated weighting function 530, region A from [0 ms, 150 ms] may have been chosen to capture false starts which could be considered an indicator of the impulsivity of subject 170. If (in the case of the operational task being evaluated) impulsivity would have a significantly negative impact on safety risk, task quality, success and/or the like, then weighting function 530 assigns a high weight value (e.g. 1) to reaction times in region A relative to the other regions. For the same operational environment, reaction times in region B (150 ms, 250 ms] could considered optimal and assigned a relatively low weigh value (e.g. 0), reaction times in region C (250 ms, 450 ms] could be considered to have increasingly negative consequence as the reaction times increase and thus be given a linearly increasing weight value. In the illustrated example, reaction times greater than 450 ms (region D) could be considered lapses of attention and are assigned a constant weight that is relatively high (e.g. 0.7).

The specific mathematical expression of exemplary weighting function 530 is given by:

$$w(x) = \begin{cases} 1 & 0 \text{ ms} \le x \le 150 \text{ ms} \\ 0 & 150 \text{ ms} < x \le 250 \text{ ms} \\ 0.0035x - 0.875 & 250 \text{ ms} < x \le 450 \\ 0.7 & x > 450 \end{cases}$$

where w(x) is the weight assigned to a reaction time x. It should be understood that in other embodiments, the number of regions, location of time transition points and shapes of the weighting functions or regions thereof may be varied.

In particular embodiments, weighting functions 812 (FIG. 8) or parameters/characteristics thereof may be adjusted or selected, based at least in part on a pre-analysis (e.g. statistical analysis) of a particular set of reaction time data 810. By way of non-limiting example, the reaction time corresponding to a transition point in a piece-wise weighting function (e.g. a transition point between region A and region B in weighting function 830 (FIG. 5G) could be set relative to the mean of reaction time data 810, the median of reaction time data 810, the $n^{th}$ fastest percentile of reaction time data 810, the variance of reaction time data 810, the minimum or maximum of reaction time data 810, the total number of reaction times in the reaction time data 810 and/or some other statistical measure of reaction time data 810. In addition to the transition point(s) between regions, other non-limiting examples of characteristics of weighting functions 812 that could be based on pre-analysis of reaction time data 810 include: the slope of a linear weight function region, the coefficients of a polynomial weight function regions, the exponential constants of exponential weight function portions, the number of regions in a piece-wise weighting function and/or the like. In other embodiments, characteristics of weighting functions 812 may be based on statistical characteristics of other reaction time data—e.g. historical reaction time data for subject 170 (e.g. that may or may not include current reaction time data 810), historical reaction time data for a population sample which may include subject 170 and/or other individuals.

In some embodiments, the selection of weighting functions 812 in block 804, weighting function themselves 812 and/or the characteristics of weighting functions 812 may be user-configurable—e.g. by subject 170, by a test administrator 220 or by some other test administrator.

Method 800 then proceeds to block 806 which involves determining one or more weighted metrics 814 based on application of weighting functions 812 selected in block 804 to reaction time data 810 obtained in block 802. Each weighted reaction time metric 814 may be represented by the variable m and may be determined based on a corresponding weighting function w according to equation (1):

$$m = \sum_{i=1}^{N} \frac{w(x_i)}{N} \tag{1}$$

where $x_i$ is the $i^{th}$ reaction time in reaction time data 810, $w(x_i)$ is the corresponding weighting function w evaluated at the $i^{th}$ reaction time and N is the total number of reaction times in reaction time data 810. In this embodiment, there is a one to one correspondence between each of the weighted reaction time metrics 814 and corresponding weighting functions 812.

It will be appreciated that where weighting functions 812 are bounded between 0 and 1, weighted reaction time metrics 814 determined according to equation (1) will also be bound between 0 and 1.

Figure 6A:
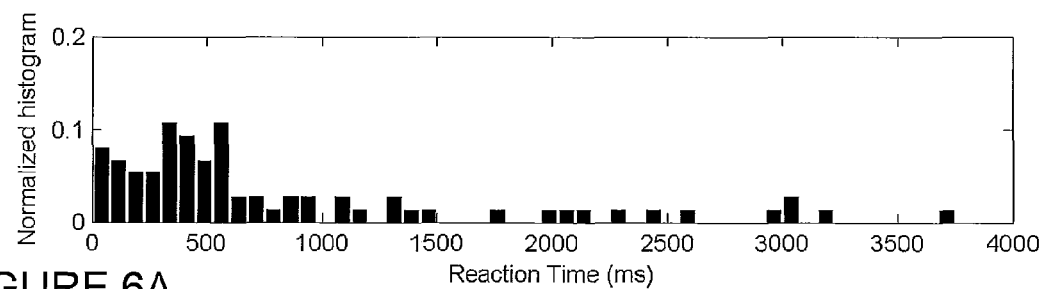
FIGS. 6A-6C respectively show plots illustrative of a histogram of normalized reaction times from an example stimulus-response test, a reaction time weighting function, and a histogram of weighted normalized reaction times.
Figure 6B:
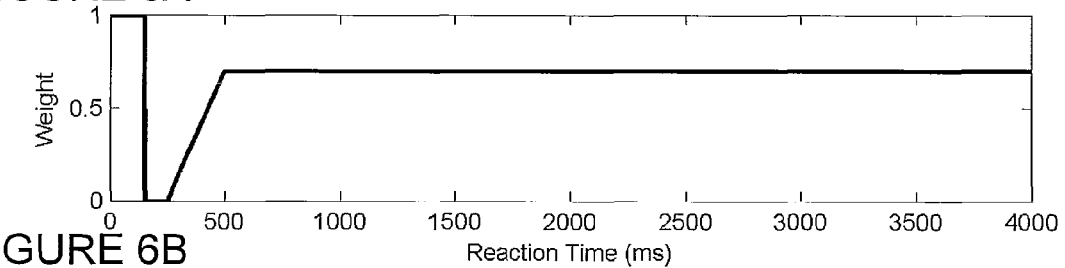
Figure 6C:
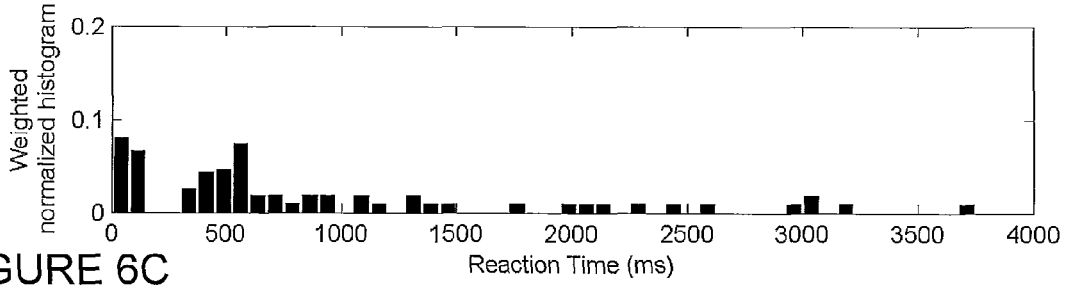

FIGS. 6A, 6B and 6C schematically depict the application of some of the procedures of blocks 802, 804 and 806. FIG. 6A shows a plot of a histogram of normalized reaction time data 810 from an example stimulus-response test which may be obtained (e.g. from test system 150) in block 802. The FIG. 6A reaction time data 810 is shown in a histogram plot similar to the histogram plot of FIG. 4B, except that the FIG. 6A reaction time data 810 has been normalized by dividing each bin count by the total number of reaction times N. FIG. 6B shows an exemplary weighting function 812 which may be selected in block 804. The FIG. 6B weighting function 812 is the same as the FIG. 5G weighting function 530 described above. FIG. 6C shows a histogram of weighted normalized reaction times (i.e. the application of the FIG. 6B weighting function 812 to the FIG. 6A reaction time data 810). The weighted reaction time metric 814 determined in block 806 may be obtained by integrating or adding up the area of the FIG. 6C weighted histogram. The FIG. 6B weighting function 812 represents one exemplary weighting function 812 which may be selected in block 804, but any of the other weighting functions described herein (e.g. any of the functions in FIGS. 5A-5G) may be used in the place of the FIG. 6B weighting function 812.

Because of its denominator N representing the total number of reaction times, equation (1) provides a weighted average reaction time metric 814. In other embodiments, block 806 may involve determining a weighted sum reaction time metric 814 according to equation (2):

$$m = \sum_{i=1}^{N} w(x_i) \tag{2}$$

By way of non-limiting example, weighted sum reaction time metric 814 of equation (2) may be utilized with weighting function 502 (FIG. 5A) to determine a number of reaction times greater than 500 ms that occurred in a set of reaction time data 810.

As a part of or prior to determining a weighted reaction time metric 814 in block 806, reaction time data 810 may optionally be pre-filtered. One example type of pre-filtering operation may involve removing all reaction times in specified range(s). For example, in some applications it may be desirable to pre-filter reaction time data 810 to remove all reaction times in a range [0 ms, 150 ms), because such reaction times may be considered to be representative of false starts. With this type of pre-filter, the total number of reaction times N used in equation (1) would be reduced by the number of reaction times that are eliminated. Another example of a pre-filter operation is to re-assign all false starts (e.g. reaction times in a range [0 ms, 150 ms)) to have a reaction time of 0 ms. In the case of such a pre-filtering operation, the number of reaction times N would be equal to the valid reaction times plus the number of false starts.

Figure 9:
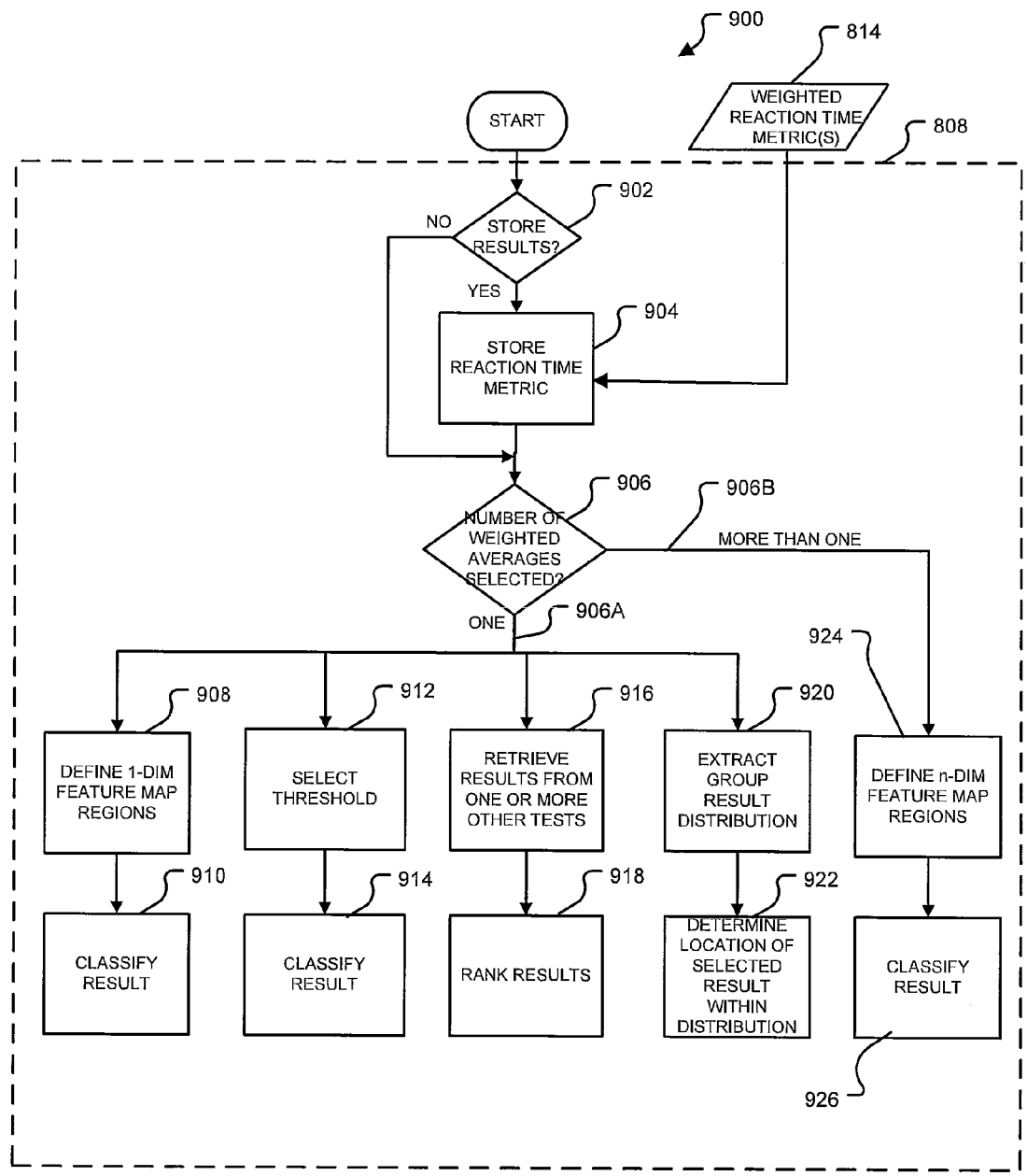
FIG. 9 is a schematic flow chart diagram illustrating a method for processing weighted reaction time metrics according to a particular embodiment.

Returning to FIG. 8, after determining weighted reaction time metric 814 in block 806, method 800 proceeds to block 808 which involves processing weighted reaction time metric 814. FIG. 9 shows a more detailed flow chart diagram of a method 900 for performing the block 808 processing according to a particular embodiment. Method 900 commences in block 902 which involves an optional inquiry into whether the one or more weighted reaction time metrics 814 generated in block 806 are to be stored. If the block 902 inquiry is negative, then method 900 proceeds to block 906. If, on the other hand, the block 902 inquiry is positive, then method 900 proceeds to block 904 which involves storing the one or more weighted reaction time metrics 814. By way of non-limiting example, storage of weighted reaction time metrics 814 may comprise storing such reaction time metrics 814 in data storage 162, 262 of evaluation systems 100, 200 (FIGS. 1 and 2). The block 904 storage of weighted reaction time metrics 814 may additionally or alternative comprise adding weighted reaction time metrics 814 to a database. The block 904 storage of weighted reaction time metrics 814 may involve assigning indexing information (e.g. date, a subject identifier, particulars of the test system being used and/or the like) to the weighted reaction time metrics 814, such that such indexing information may be used subsequently to identify, group or otherwise index metrics 814.

Method 900 then proceeds to block 906 which involves an inquiry into the number of weighted reaction time metrics 814 which will be processed in this particular iteration of method 900. Method 900 may involve selecting a subset of the available weighted reaction time metrics 814 for subsequent processing. If it is determined in the block 906 inquiry that one metric 814 is to be processed, then method 900 proceeds along path 906A, otherwise method 900 proceeds along path 906B. If it is determined in the block 906 inquiry that one metric 814 is to be processed, then there are a number of available processing procedures that may be performed on the selected metric 814.

Block 912 involves comparing the selected metric 814 to a threshold and block 914 may involve classifying the result of the block 912 comparison (e.g. metric 814 is greater than, less than or equal to the block 912 threshold). The block 912 threshold may be pre-programmed or user-configurable. In some embodiments, the block 912 threshold may be selected based at least in part on historical reaction time data for subject 170 and/or for a wider group of subjects. Blocks 916, 918 represent another possible processing procedure where one or more other metrics from one or more other tests are retrieved and the current metric 814 is ranked in relation to the other metrics and/or compared to one or more statistical characteristics (e.g. the mean, the maximum, the minimum or the like) of the other metrics. The other metrics may comprise metrics derived from historical reaction time data which may comprise historical reaction time data of subject 170 and/or of a wider sample. Ranking the metrics in block 918 may comprise ordering all test metrics in ascending order from highest to lowest, and producing an index output corresponding to the rank order of each metric. Blocks 920, 922 represent another possible processing procedure which involves determining a probability distribution of metrics representative of a sample, then assessing the rank of the current metric 814 relative to the probability distribution of the sample. For example, a cumulative probability distribution function could be determined for the sample, either as a pre-calculated function, or by calculating from a data set of previously available metrics, and the value of the cumulative probability distribution function corresponding to the current metric 814 could provide a value between 0% and 100% indicating the percentile of the current metric 814 relative to the sample. The sample metrics may comprise metrics derived from historical reaction time data which may comprise historical reaction time data of subject 170 and/or of a wider sample. Blocks 908, 910 represent another possible processing procedure which involves defining 1-dimensional feature map having one or more regions which span the range of possible values of metric 814. Such a feature map could comprise a set of a contiguous regions with defined boundaries, wherein each region is associated with a corresponding classification. Based on the location of the current metric 814 within the range of possible metric values (i.e. the location of the current metric in the feature map), the current metric 814 is then associated with a corresponding region and corresponding classification. Note that the threshold classification of blocks 912, 914 is a particular example of the more general feature map region classification of blocks 908, 910.

The individual processing procedures of method 900 are not exclusive. Block 808 may involve multiple iterations of method 900 and each such iteration may involve a different processing procedure. In some embodiments, various processing procedures can be performed in a single iteration of method 900. Each of the method 900 processing procedures shown for a single weighted reaction time metric 814 may be performed independently for a plurality of weighted reaction time metrics 814.

Figure 7:
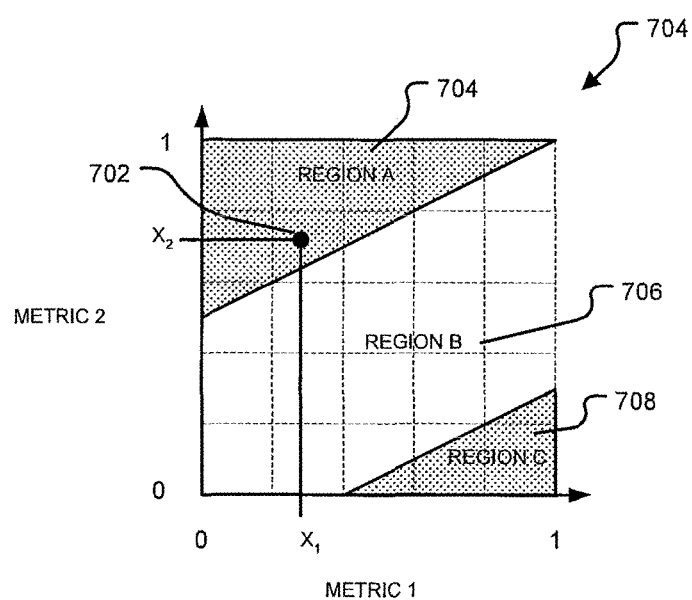
FIG. 7 shows an example feature map plot illustrating a two-dimensional classification of results from a reaction time test based on two weighting functions.

Blocks 924, 926 represent an exemplary type of processing procedure that may be performed with multiple metrics 814. Block 924 involves defining a n-dimensional feature map that spans the n-dimensional range of possible values of the multiple metrics 814 where n is the number of selected metrics. The block 924 feature map comprises a set of a contiguous regions with defined boundaries, wherein each region is associated with a corresponding classification. Based on the location of the n selected metric 814 within the range of possible metric values (i.e. the locations of the current metrics 814 in the feature map), a corresponding region and corresponding classification is assigned. An exemplary 2-dimensional feature map 704 is shown in FIG. 7. Map 704 is a two dimensional map corresponding to the number (two) of selected metrics $X_1$, $X_2$. Map 704 comprises three regions 704 (region A), 706 (region B), 708 (region C) which are defined by boundaries therebetween. Each of regions A, B, C is associated with a corresponding classification (not shown). Depending on the values of the selected metrics $X_1$, $X_2$, a location 702 is determined and falls within one of regions A, B, C. In the illustrated embodiment, location 702 is within region A and the block 926 results assigns a classification corresponding to region A.

As will be apparent to those skilled in the art in the light of the foregoing disclosure, many alterations and modifications are possible in the practice of this invention without departing from the spirit or scope thereof. For example:

In the exemplary weighting functions described above, relatively high weights are assigned to undesirable outcomes. For example, weighting function 502 (FIG. 5C) assigns a high weight (w=1) to the undesirable circumstance of a reaction time greater than 500 ms. As another example, weighting function 530 (FIG. 5G) assigns a high weight (w=1) to false starts (i.e. reaction times less than 150 ms) and a relatively high weight (w=0.7) to reaction times that are undesirably slow (i.e. greater than 500 ms). With this weighting function design, when the weighted reaction time metrics 814 are determined in block 806 (e.g. in accordance with equations (1) and/or (2)), the result is that sets of reaction time data 810 having a relatively large number of undesirable reaction times (i.e. undesirable test results) are determined to have a relatively large weighted reaction time metrics 814. Similarly, with this weighting function design, sets of reaction times with desirable reaction times (i.e. desirable test results) are determined to have relatively low weighted reaction time metrics 814. This weighting function design is not necessary. In other embodiments, weighting functions could be designed to assign relatively high values to desirable outcomes and relatively low values to undesirable outcomes. With this contrasting weighting function design, relatively high reaction time metrics 814 will be indicative of desirable test results and relatively low reaction time metrics 814 will be indicative of undesirable test results.

The exemplary feature maps described above comprise one or more regions, each region associated with a corresponding classification. Such classification may take a variety of forms, with non-limiting examples including a descriptive code (e.g. "severe impairment"), or a numeric value (e.g. a percentage between 0 and 100). In some embodiments the number of regions may be high such that the feature-map represents a continuous surface.

In some embodiments, data transmission interface 206 (FIG. 2) may comprise a variety of physical and protocol transmission layers. Non-limiting examples of physical layers include wires, infrared transceivers, radio frequency transceivers, and optical cable. Non-limiting examples of transmission standards that may be used include HTTP, Bluetooth, USB, Wi-Fi, CDMA, GSM, and Ethernet. In some embodiments metrics controller 210 may be implemented as a central server with control interface 208 implemented as a distributed application accessing metrics controller 210 over the internet.

What is claimed is:

1. A method for using a processor to evaluate reaction time data obtained from a stimulus-response testing system, the method comprising:
    obtaining, by a processor, reaction time data, the reaction time data comprising a plurality of reaction times, each reaction time comprising an estimate of a time required for a subject to respond to a corresponding stimulus event;
    assigning, by the processor, a weight to each reaction time in the reaction time data in accordance with a weighting function, the weighting function comprising a rule that defines a mapping between reaction times and corresponding weights, wherein the weight assigned to each reaction time is based at least in part on a property of the reaction time; and
    determining, by the processor, a weighted reaction time metric based at least in part on a sum of the weights assigned to the reaction times in the reaction time data, the weighted reaction time metric being indicative of a neurobehavioral characteristic of the subject;
    wherein determining the weighted reaction time metric comprises normalizing the sum by dividing the sum by a total number of reaction times within the reaction time data.

2. A method according to claim 1 wherein at least a portion of the weighting function comprises a step that occurs at a user-configurable time transition point, the user-configurable time transition point defining a boundary, as determined by an administrative user, between acceptable reaction times and undesirably long reaction times.

3. A method according to claim 2 comprising setting the time transition point based at least in part on statistical characteristics of the reaction time data.

4. A method according to claim 2 comprising setting the time transition point based at least in part on statistical characteristics of historical reaction time data for the subject.

5. A method according to claim 1 wherein at least a portion of the weighting function comprises a step that occurs at a user-configurable time transition point, the user-configurable time transition point defining a boundary, as determined by an administrative user, between acceptable reaction times and undesirably short reaction times considered to be false starts where the subject has initiated a response prior to actually perceiving a stimulus event.

6. A method according to claim 5 comprising establishing the user-configurable time transition point at the time of manufacture.

7. A method according to claim 5 comprising setting the time transition point based at least in part on statistical characteristics of the reaction time data.

8. A method according to claim 5 comprising setting the time transition point based at least in part on statistical characteristics of historical reaction time data for the subject.

9. A method according to claim 1 wherein the weighting function comprises:
    a first step that occurs at a first user-configurable time transition point, the first user-configurable time transition point defining a first boundary, as determined by an administrative user, between acceptable reaction times and undesirably short reaction times considered to be false starts where the subject has initiated a response prior to actually perceiving a stimulus event; and
    a second step that occurs at a second user-configurable time transition point greater than the first user-configurable time transition point, the second user-configurable time transition point defining a second boundary, as determined by an administrative user, between acceptable reaction times and undesirably long reaction times.

10. A method according to claim 1 wherein at least a portion of the weighting function comprises a linear function having a slope which assigns relatively undesirable weights to relatively high reaction times and relatively desirable weights to relatively low reaction times.

11. A method according to claim 10 comprising setting the slope of the linear function based at least in part on statistical characteristics of the reaction time data.

12. A method according to claim 1 wherein at least a portion of the weighting function comprises an exponential function having an exponent term which assigns relatively undesirable weights to relatively high reaction times and relatively desirable weights to relatively low reaction times.

13. A method according to claim 1 wherein the weighting function comprises a plurality of portions:
    a first portion comprising a first step that occurs at a first user-configurable time transition point, the first user-configurable time transition point defining a boundary, determined by an administrative user, between acceptable reaction times and undesirably short reaction times considered to be false starts where the subject has initiated a response prior to actually perceiving a stimulus event, the first portion assigning relatively undesirable weights to reaction times lower than the first time transition point and relatively desirable weights to reaction times greater than the first time transition point;
    a second portion defined between a second user-configurable time transition point greater than the first user-configurable time transition point and a third user-configurable time transition point greater than the second user-configurable time transition point, the second portion assigning relatively undesirable weights to relatively high reaction times between the second and third time transition point and relatively desirable weights to relatively low reaction times between the second and third user-configurable time transition point.

14. A method according to claim 13 wherein the weighting function comprises a third portion defined between the first and second time transition points, the third portion assigning, to reaction times between the first and second time transition points, weights that are at least as desirable or more desirable than the most desirable weights assigned by the first and second portions.

15. A method according to claim 14 wherein the weighting function comprises a fourth portion defined for reaction times greater than the third time transition point, the fourth portion assigning, to reaction times greater than the third time transition point, weights that are less desirable than the weights assigned by the second and third portions but are more desirable than the weights assigned by the first portion.

16. A method according to claim 13 comprising setting at least one of the first, second and third time transition points based at least in part on statistical characteristics of the reaction time data.

17. A method according to claim 13 comprising setting at least one of the first, second and third time transition points based at least in part on statistical characteristics of historical reaction time data for the subject.

18. A method according to claim 1 comprising evaluating the weighted reaction time metric by comparing the weighted reaction time metric to a user-configurable threshold reaction time metric value and determining whether the weighted reaction time metric is greater than, less than or equal to the user-configurable threshold reaction time metric value.

19. A method according to claim 18 comprising establishing the user-configurable threshold reaction time metric value at the time of manufacture.

20. A method according to claim 1 comprising evaluating the weighted reaction time metric by obtaining one or more second weighted reaction time metrics determined on a basis of one or more corresponding second sets of reaction time data and comparing the weighted reaction time metric to the second weighted reaction time metrics.

21. A method according to claim 20 wherein the one or more second weighted reaction time metrics comprise a plurality of second weighted reaction time metrics and wherein comparing the weighted reaction time metric to the second weighted reaction time metrics comprises ranking the weighted reaction time metric in relation to the plurality of second weighted reaction time metrics.

22. A method according to claim 20 wherein the one or more second weighted reaction time metrics are determined based on one or more corresponding second sets of reaction time data associated with the subject.

23. A method according to claim 1 comprising evaluating the weighted reaction time metric by:
generating a cumulative probability distribution based on a plurality of second weighted reaction time metrics, each of the second weighted reaction time metrics determined based on a corresponding second set of reaction time data; and
assessing a percentile of the weighted reaction time metric relative to the cumulative probability distribution.

24. A method according to claim 23 wherein each of the second weighted reaction time metrics is determined based on a corresponding second set of reaction time data associated with the subject.

25. A method according to claim 1 comprising evaluating the weighted reaction time metric by:
defining a 1-dimensional feature map having one or more regions which span the range of possible values of the weighted reaction time metric, the regions defined by boundaries;
locating the weighted reaction time metric within the 1-dimensional feature map; and
classifying the weighted reaction time metric based on its location within the 1-dimensional feature map.

26. A method according to claim 1 comprising:
repeating assigning weights to each reaction time and determining a weighted reaction time metric a plurality of n times, each time with a different weighting function to obtain a corresponding plurality of n weighted reaction time metrics; and
evaluating the plurality of n weighted reaction time metrics by:
defining an n-dimensional feature map having one or more regions which span the n-dimensional range of possible values of the plurality of n weighted reaction time metrics, the regions defined by boundaries;
locating the n weighted reaction time metrics within the n-dimensional feature map; and
classifying the plurality of n weighted reaction time metrics based on their locations within the n-dimensional feature map.

27. A method according to claim 1 wherein the weighted reaction time metric is correlated with a neurobehavioural characteristic of the subject and wherein the method comprises evaluating the neurobehavioural characteristic by comparing the weighted reaction time metric to a user-configurable threshold reaction time metric value.

28. A method according to claim 1 wherein the weighted reaction time metric is correlated with an ability of the subject to perform an operational task and wherein the method comprises evaluating the ability of the subject to perform the operational task by comparing the weighted reaction time metric to a user-configurable threshold reaction time metric value.

29. A method according to claim 1 wherein the weighted reaction time metric is correlated with at least one of: a behavioral characteristic of the subject and a medical condition of the subject, and wherein the method comprises evaluating the behavioral characteristic or the medical condition of the subject by comparing the weighted reaction time metric to a user-configurable threshold reaction time metric value.

30. A method according to claim 1 wherein the reaction time data comprises one or more false start times, each false start time comprising a time at which the subject responded in an absence of a corresponding stimulus event.

31. A method according to claim 30 comprising identifying false start times within the reaction time data and assigning, to each identified false start time, a common reaction time value.

32. A method according to claim 1 wherein, prior to determining the weighted reaction time metric, excluding reaction times within a particular reaction time exclusion range.

33. A method according to claim 32 wherein the particular reaction time exclusion range comprises a range between zero and a user-configurable false start time transition point.

34. A system for evaluating reaction time data obtained from a stimulus-response testing system, the system comprising:
a controller connected to receive reaction time data, the reaction time data comprising a plurality of reaction times, each reaction time comprising an estimate of a time required for a subject to respond to a stimulus event, the controller configured to:
assign a weight to each reaction time in the reaction time data in accordance with a weighting function, the weighting function comprising a rule that defines a mapping between reaction times and corresponding weights, wherein the weight assigned to each reaction time is based at least in part on a property of the reaction time; and determine a weighted reaction time metric based at least in part on a sum of the weights assigned to the reaction times in the reaction time data, the weighted reaction time metric being indicative of a neurobehavioral characteristic of a subject;

wherein determining the weighted reaction time metric comprises normalizing the sum by dividing the sum by a total number of reaction times within the reaction time data.

35. A method for using a processor to evaluate the ability of a subject to perform an operational task, the method comprising:

providing a stimulus-response test system comprising a stimulus output device for outputting stimulus events and a response input device for receiving responses from the subject;

obtaining, by a processor, reaction time data from the stimulus response test system, the reaction time data comprising a plurality of reaction times, each reaction time comprising an estimate of a time required for a subject to respond to a corresponding stimulus event;

assigning, by the processor, a weight to each reaction time in the reaction time data in accordance with a weighting function, the weighting function comprising a rule that defines a mapping between reaction times and corresponding weights, wherein the weight assigned to each reaction time is based at least in part on a property of the reaction time; and determining, by the processor, a weighted reaction time metric based at least in part on a sum of the weights assigned to the reaction times in the reaction time data, the weighted reaction time metric correlated with the ability of the subject to perform the operational task;

wherein determining the weighted reaction time metric comprises normalizing the sum by dividing the sum by a total number of reaction times within the reaction time data.

36. A method according to claim 35 comprising evaluating the ability of the subject to perform the operational task by comparing the weighted reaction time metric to a user-configurable threshold reaction time metric value.

37. A method according to claim 1 wherein the weight assigned to each reaction time is based at least in part on a duration of the reaction time.

* * * * *

UNITED STATES PATENT AND TRADEMARK OFFICE
CERTIFICATE OF CORRECTION

PATENT NO. : 8,794,976 B2  
APPLICATION NO. : 12/776142  
DATED : August 5, 2014  
INVENTOR(S) : Kan et al.

Page 1 of 1

It is certified that error appears in the above-identified patent and that said Letters Patent is hereby corrected as shown below:

Title page

Item (75) Inventors: Add -- David Dinges and Mathias Basner --.

Signed and Sealed this  
Fifth Day of April, 2016

Michelle K. Lee  
*Director of the United States Patent and Trademark Office*